United States Patent
Palanisamy et al.

(10) Patent No.: US 11,596,023 B2
(45) Date of Patent: *Feb. 28, 2023

(54) OVERLOAD CONTROL AND COORDINATION BETWEEN M2M SERVICE LAYER AND 3GPP NETWORKS

(71) Applicant: IPLA HOLDINGS INC., New York, NY (US)

(72) Inventors: Suresh Palanisamy, Namakkal District (IN); Michael F. Starsinic, Newtown, PA (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,741

(22) Filed: Dec. 17, 2020

(65) Prior Publication Data

US 2021/0176816 A1 Jun. 10, 2021

Related U.S. Application Data

(63) Continuation of application No. 15/300,868, filed as application No. PCT/US2015/023558 on Mar. 31, 2015, now Pat. No. 10,904,946.

(60) Provisional application No. 61/972,746, filed on Mar. 31, 2014.

(51) Int. Cl.
*H04W 76/36* (2018.01)
*H04W 28/02* (2009.01)
*H04W 4/70* (2018.01)

(52) U.S. Cl.
CPC ............. *H04W 76/36* (2018.02); *H04W 4/70* (2018.02); *H04W 28/0289* (2013.01); *H04W 28/0215* (2013.01)

(58) Field of Classification Search
CPC ... H04W 76/36; H04W 4/70; H04W 28/0289; H04W 28/0215
See application file for complete search history.

(56) References Cited

U.S. PATENT DOCUMENTS

| 8,554,931 B1 | 10/2013 | Vossoughian |
| 8,589,524 B1 | 11/2013 | Sella et al. |
| 9,226,222 B2 | 12/2015 | Zhou et al. |
| 9,445,323 B1 | 9/2016 | Ramamurthy et al. |

(Continued)

FOREIGN PATENT DOCUMENTS

| EP | 2509357 A1 | 10/2012 |
| KR | 10-2013-0129811 A | 11/2013 |

(Continued)

OTHER PUBLICATIONS

3GPP SA WG2 Meeting #98 S2-132505 "Evaluation of Overload Control for Device Triggering" Jul. 2013, 4 pages.

(Continued)

*Primary Examiner* — Tejis Daya
(74) *Attorney, Agent, or Firm* — Chip Law Group

(57) ABSTRACT

Various issues with existing congestion and overload control mechanisms are recognized and described herein. Described herein, in accordance with various embodiments, are various mechanisms in which core networks, such as 3GPP networks for example, and an M2M service layer can coordinate and share information to efficiently and intelligently manage each other's congestion and overload states.

11 Claims, 17 Drawing Sheets

(56) References Cited

U.S. PATENT DOCUMENTS

| | | | |
|---|---|---|---|
| 2006/0233110 A1* | 10/2006 | Yang | H04W 28/12 370/237 |
| 2008/0095056 A1* | 4/2008 | Lien | H04L 47/12 370/252 |
| 2008/0307081 A1 | 12/2008 | Dobbins et al. | |
| 2011/0145319 A1 | 6/2011 | Dolan et al. | |
| 2012/0030358 A1 | 2/2012 | Mackenzie | |
| 2012/0117235 A1 | 5/2012 | Castro et al. | |
| 2012/0257571 A1 | 10/2012 | Liao | |
| 2013/0088956 A1 | 4/2013 | Zhou et al. | |
| 2013/0107773 A1 | 5/2013 | Chang | |
| 2014/0038549 A1 | 2/2014 | Lehane et al. | |
| 2014/0112251 A1* | 4/2014 | Kim | H04W 4/12 370/328 |
| 2014/0134996 A1 | 5/2014 | Barclay et al. | |
| 2014/0254367 A1* | 9/2014 | Jeong | H04W 28/0205 370/233 |
| 2014/0269779 A1 | 9/2014 | Shan et al. | |
| 2014/0274186 A1 | 9/2014 | Cai et al. | |
| 2014/0307549 A1 | 10/2014 | Kotecha et al. | |
| 2014/0341041 A1* | 11/2014 | Velev | H04W 76/10 370/236 |
| 2015/0023219 A1 | 1/2015 | Jin et al. | |
| 2015/0033312 A1 | 1/2015 | Seed et al. | |
| 2015/0103664 A1* | 4/2015 | Shan | H04L 1/1861 370/235 |
| 2015/0117347 A1 | 4/2015 | Iwai | |
| 2015/0189532 A1 | 7/2015 | Dimou | |
| 2015/0195831 A1 | 7/2015 | Du et al. | |
| 2015/0200861 A1* | 7/2015 | Lee | H04L 67/42 709/203 |
| 2015/0264512 A1* | 9/2015 | Jain | H04W 4/70 370/328 |
| 2015/0282145 A1 | 10/2015 | Kim et al. | |
| 2015/0289078 A1 | 10/2015 | Kim et al. | |
| 2015/0319640 A1* | 11/2015 | Liao | H04W 88/16 370/230 |
| 2015/0341889 A1 | 11/2015 | Starsinic et al. | |
| 2016/0007316 A1 | 1/2016 | Vaidya et al. | |
| 2016/0142860 A1* | 5/2016 | Kim | H04W 80/02 455/435.1 |
| 2016/0198049 A1 | 7/2016 | Iwai | |
| 2016/0381691 A1* | 12/2016 | Panchai | H04L 1/203 370/329 |
| 2017/0242730 A1* | 8/2017 | Wang | H04L 29/08099 |

FOREIGN PATENT DOCUMENTS

| | | |
|---|---|---|
| WO | 2011/130912 A1 | 10/2011 |
| WO | 2011/154761 A1 | 12/2011 |
| WO | 2013/166230 A2 | 11/2013 |

OTHER PUBLICATIONS

3rd Generation Partnership Project; (3GPP) TR 23.862 V12.0.0; "3rd Generation Partnership Project; Technical Specification Group Services and System Aspects; Evolved Packet Core (EPC) Enhancements to Support Interworking With Data Application Providers; Stage 2 (Release 12)", Dec. 2013, 23 pages.

3rd Generation Partnership Project; (3GPP) TR 23.888 V2.0.0, "3rd Generation Partnership Project; Technical Specification Group Services and System Aspects; System Improvements for Machine-Type Communications", (Release 11), Aug. 2012, 166 pages.

3rd Generation Partnership Project; (3GPP) TS 23.060 V12.4.0; "3rd Generation Partnership Project; Technical Specification Group Services and System Aspects; General Packet Radio Service (GPRS); Service description; Stage 2 (Release 12)", Mar. 2014, 345 pages.

3rd Generation Partnership Project; (3GPP) TS 23.203 V12.4.0; "3rd Generation Partnership Project; Technical Specification Group Services and System Aspects; Policy and Charging Control Architecture; (Release 12)", Mar. 2014, 218 pages.

3rd Generation Partnership Project; (3GPP) TS 23.335 V11.0.0; "3rd Generation Partnership Project; Technical Specification Group Core Network and Terminals; User Data Convergence (UDC); Technical Realization and Information Flows; Stage 2 (Release 11)", Sep. 2012, 39 pages.

3rd Generation Partnership Project; (3GPP) TS 23.401 V12.4.0; "3rd Generation Partnership Project; Technical Specification Group Services and System Aspects; General Packet Radio Service (GPRS) Enhancements for Evolved Universal Terrestrial Radio Access Network (E-UTRAN) access (Release 12)", Mar. 2014, 302 pages.

3rd Generation Partnership Project; (3GPP) TS 23.682 V12.1.0; "3rd Generation Partnership Project; Technical Specification Group Services and System Aspects; Architecture Enhancements to Facilitate Communications With Packet Data Networks and Applications (Release 12)", Mar. 2014, 32 pages.

3rd Generation Partnership Project; (3GPP) TS 29.213 V12.3.0; "3rd Generation Partnership Project; Technical Specification Group Core Network and Terminals; Policy and Charging Control Signalling Flows and Quality of Service (QoS) Parameter Mapping (Release 12)", Mar. 2014, 204 pages.

3rd Generation Partnership Project; (3GPP) TS 29.214 V12.3.0; "3rd Generation Partnership Project; Technical Specification Group Core Network and Terminals; Policy and Charging Control over Rx Reference Point (Release 12)", Mar. 2014, 59 pages.

3rd Generation Partnership Project; (3GPP) TS 29.368 V12.0.0; "3rd Generation Partnership Project; Technical Specification Group Core Network and Terminals; Tsp interface protocol between the MTC Interworking Function (MTC-IWF) and Service Capability Server (SCS) (Release 12)", Mar. 2014, 28 pages.

3rd Generation Partnership Project; (3GPP); TR 23.887; "Evaluation of Overload Control for Device Triggering" Source, ZTE; Document for; Discussion and Approval; Agenda Item: 6.2.1; (Release 12), Jul. 2013, 4 pages.

3rd Generation Partnership Project; (3GPP); TS 36.331 V12.1.0; "3rd Generation Partnership Project; Technical Specification Group Radio Access Network; Evolved Universal Terrestrial Radio Access (E-UTRA); Radio Resource Control (RRC); Protocol specification (Release 12)", Mar. 2014, 356 pages.

3rd Generation Partnership Project; (3GPP); TS 44.018 V12.2.0; 3rd Generation Partnership Project; Technical Specification Group GSM/EDGE Radio Access Network; Mobile radio interface layer 3 specification; Radio Resource Control (RRC) protocol (Release 12), Mar. 2014, 467 pages.

International Patent Application No. PCT/US2015/023558: International Preliminary Report on Patentability dated Oct. 13, 2016, 15 pages.

Janevski, "NGN Architectures, Protocols and Services—6.6 NGN Architecture for MPLS Core Networks", John Wiley & Sons, Incorporated, Mar. 7, 2014, 213-215.

Sasada et al, "Further Development of LTE/LTE-Advanced-LTE Release 10/11 Standardization Trends-M2M 3GPP Standardization—Core Network Infrastructure and Congestion Control Technology for M2M Communications", NTT Docomo Technical Journal, Nov. 18, 2013, 31-36 pages.

Scarrone et al., "Overview of ETSI TC M2M Activities" ETSI 2011, Mar. 2012, 19 pages.

Study on Machine-Type Communications (MTC) and other mobile data applications communications enhancements, Dec. 2013, 3GPP TR 23.887 V12.0.0. (Year: 2013).

Tekelec, White Paper, "Machine-to-Machine Services", Mar. 2, 2011, 1-18 pages, http://www.m2mnow.biz/wp-content/upload/2011/06/tekelec M2M WP Mar11.pdf.

3GPP: "3rdGeneration partnership Project; Technical Specification Group Services and System Aspects; System Improvements for Machine-Type Communications (Release 11)", 3GPP TR 23.888 V1.6.1, Feb. 1, 2012 (Feb. 1, 2012), XP055166919.

Huawei: "Discussion on a Service Capability Exposure Framework", 3GPP Draft; S2-141176_S2_102_SCEF V3, 3rd Generation Partnership Project (3GPP), Mobile Competence Centre; 650, Route Des Lucioles; F-06921 Sophia-Antipolis Cedex; France, vol. SA

(56) References Cited

OTHER PUBLICATIONS

WG2, No. st. Julian; Mar. 24, 2014-Mar. 28, 2014 Mar. 18, 2014 (Mar. 18, 2014), XP050835671.

* cited by examiner

OVERLOAD CONTROL AND COORDINATION BETWEEN M2M SERVICE LAYER AND 3GPP NETWORKS

CROSS REFERENCE TO RELATED APPLICATIONS

This application is a continuation of U.S. application Ser. No. 15/300,868 filed Sep. 30, 2016 which is the National Stage Application filed under 35 U.S.C. 371 of International Application No. PCT/US2015/023558, filed Mar. 31, 2015, which claims the benefit of U.S. Provisional Patent Application Ser. No. 61/972,746 filed Mar. 31, 2014, the disclosures of which are hereby incorporated by reference as set forth in their entirety herein.

BACKGROUND

Machine type communication (MTC) refers to communications between different entities or nodes that does not necessarily involve human interaction. MTC devices may utilize the services of a Service Capability Server (SCS) to communicate with external MTC applications. A network constructed in accordance with the third Generation Partnership Project (3GPP), which can be referred to as a 3GPP system, can provide transport for machine-to-machine (M2M) device communication. In addition, the 3GPP system may provide other value added services for machine type communication. Different architectural models are possible in the 3GPP system based on the relationship of an MTC service provider (SP) and the 3GPP network operator. An architectural enhancement for MTC is defined in 3GPP TS 23.682, "Architecture enhancements to facilitate communications with packet data networks and applications," which is incorporated by reference as if its contents are set forth herein. Referring to FIG. 1A, an architecture 101 for MTC in a 3GPP system is shown. As shown, a Machine Type Communication-Inter Working Function (MTC-IWF) 102 is introduced in the 3GPP system to enable the communication of 3GPP networks with one or more service capability servers (SCSs) 104. The MTC-IWF 102 can be a standalone entity or a functional entity of another network element. The MTC-IWF 102 hides the internal Public Land Mobile Network (PLMN) topology, and relays or translates information sent over a Tsp reference point to invoke specific functionality in the PLMN.

A policy and charging control (PCC) architecture 106 may be used in 3GPP networks to enable policy control and charging control. The PCC architecture 106 can be part of an example 3GPP system, as shown in FIG. 1B. As shown, the Rx reference point is defined between the Policy and Charging Rules Function (PCRF) 108 and application functions (AFs), for instance an application function (AF) 110. The Rx reference point can be used to exchange application level session information between the PCRF 108 and the AF 110. This information is part of the input used by the PCRF 108 for the Policy and Charging Control (PCC) decisions as further defined in 3GPP TS 23.203, Policy and charging control architecture, which is incorporated by reference as if its contents are set forth herein. A Service Layer or the SCS 104 or a machine-to-machine (M2M) server may be considered examples of an AF.

Referring now to FIG. 1C, a User Data Convergence (UDC) architecture 112 is depicted. The UDC 112 is a logical representation of a layered architecture that separates user data from application logic, so that user data is stored in a logically unique repository allowing access from entities (nodes) handling application logic (called Application Front Ends 114). In accordance with the illustrated example, the application front ends do not store data and they access the data from a User Data Repository (UDR) 116. UDC is an optional concept that may ensure data consistency and simplify creation of new services by providing easy access to the user data. UDC may also ensure the consistency of storage and data models, and may have minimal impact on traffic mechanisms, reference points, and protocols of network elements. UDC is further defined in the UDC architecture diagram shown in FIG. 1C and in 3GPP TS 23.335, "User Data Convergence (UDC); Technical realization and information flows."

3GPP is working on solutions for interworking between mobile operators and data application providers to provide a framework for authentication, authorization, and policy and charging for various interworking scenarios. Different architectures are possible based on the relationship of the 3GPP network operator with the data application provider, such as the one described in 3GPP TR 23.862, "EPC enhancements to Support Interworking with Data Application Providers (MOSAP)," which is incorporated by reference as if its contents are set forth herein. FIG. 1D shows an architecture 118 of a solution being considered by 3GPP. As shown, several different reference points have been introduced in this architecture. Mh is the interface between a non-internet protocol (IP) multimedia system (IMS) applications and service (AS) (non-IMS AS) and a home subscriber service front end (HSS-FE). The Mh interface can span beyond 3GPP (H)PLMN. The Mh interface is similar to the Sh interface but it is not used by an IMS application. The protocols used on Mh is assumed to be based on Sh as defined in 3GPP. A Service Layer/SCS/M2M Server may be considered an example of a non-IMS AS.

The growth of M2M technology is expected to create an increase in the number of devices that need connectivity. The existing 3GPP based networks were designed to predominantly support communications involving humans, so the growth of M2M devices poses new challenges and requirements to the 3GPP based networks. For example, the number of M2M devices requiring connectivity may be several times greater than the number of traditional user equipment (UEs). The increase in the number of connected devices may cause congestion issues in 3GPP networks. Although the amount of data that is generated by a majority of the M2M devices may be relatively small, the collective data from all the M2M devices and the signaling overhead to support connectivity can be significant and may cause overload in the network. The overload caused by the M2M devices can congest both the 3GPP core network elements and the radio access network elements, which may cause degradation of the 3GPP network service or may even bring down the network. 3GPP has introduced several mechanisms, described below, in Release 10 and Release 11 of 3GPP with the intent of allowing the 3GPP based networks to control the overload and manage the congestion effectively.

For example, several new configurations at the UE side were introduced that may help the network to identify MTC devices and provide some control over UE initiated procedures that may overload a network. Clause 4.3.17.4 of 3GPP TS 23.401, "General Packet Radio Service (GPRS) enhancements for Evolved Universal Terrestrial Radio Access Network (E-UTRAN) access," and Clause 5.3.13.3 of 3GPP TS 23.060, General Packet Radio Service (GPRS); Service description," which are incorporated by reference as if the disclosures of both of which are set forth herein, provide complete details of the configurations. By way of example, the configurations include:

Low Access Priority (LAP), which is for devices that can delay their data transfers. This indicator is transmitted to the MME during the appropriate NAS signaling procedures and to the E-UTRAN during RRC connection establishment procedures. The low priority can be associated with a PDN connection when it is established and it shall not change until the PDN connection is deactivated.

Attach with IMSI at PLMN change, which is mainly to avoid signaling overload on a recipient network when a large number of UEs tries to attach after a network failure. This avoids signaling overload because the recipient network need not try to resolve the temporary ID and subsequently request the IMSI.

Long minimum periodic PLMN search time limit

Extended Access Barring support

Use of NMO I, Network Mode of Operation I

Specific handling of the invalid (U)SIM state, the "forbidden PLMN list", the "forbidden PLMNs for attach in S1mode list" and the "forbidden PLMNs for GPRS service list". The UE remembers that the USIM is invalid and keeps the PLMN forbidden lists even if the UE is switched off and then switched on.

UEs can be configured with one or more of the above options. Post-manufacturing configuration of these options in the UE can be performed by OMA DM or (U)SIM OTA procedures.

Another example mechanism to control overload and/or manage congestion is an SGSN/MME Control of Overload. For example, during an overload scenario the SGSN/MME can request the BSC/RNC/eNB to reject the RR(C) connection establishments from MSs/UEs configured for low access priority.

Another example mechanism to control overload and/or manage congestion is described in 3GPP TS 36.331, "Evolved Universal Terrestrial Radio Access (E-UTRA); Radio Resource Control (RRC); Protocol specification." MTC UEs that are configured for low priority access' can indicate it to the UTRAN/E-UTRAN during RRC Connection Request by setting the 'EstablishmentCause' value to 'delayTolerantAccess'. In an overload scenario, the UTRAN/E-UTRAN can reject new RRC connection request from the 'delay tolerant' devices or release existing connections from 'delay tolerant' devices and request the devices to wait for a longer time before re-attempt. The UTRAN/E-UTRAN can set the field 'extendedWaitTime' up to a maximum of 30 minutes in RRC Connection Reject or RRC Connection Release messages.

Another example mechanism to control overload and/or manage congestion is referred to as GERAN Low Access Priority-Implicit Reject Procedure. A BSC is enhanced to support rejection of RR connection establishments from MSs configured for low access priority during overload/congestion. When rejecting a RR connection request for overload reasons the BSC indicates to the MSs an appropriate timer value that limits further RR connection requests. An Implicit Reject Procedure is used by the BSC to prevent a mobile station configured for "low access priority" from requesting PS/CS resources, as further described in 3GPP TS 44.018, "Mobile radio interface layer 3 specification; Radio Resource Control (RRC) protocol." When a mobile station starts an implicit reject timer it selects a value randomly drawn from a uniform probability distribution within the set {10.0, 10.1, 10.2, . . . 200.0} seconds. Hence a 'low access priority' MS may wait up to a maximum of 200 seconds before re-attempt.

GERAN (from release 10) and UTRAN/E-UTRAN (from release 11) support Extended Access Barring (EAB) wherein the network/operator can selectively restrict the devices configured for EAB from accessing the network. A network can broadcast the EAB information and the UEs configured for EAB shall evaluate it to determine if its access to the network is barred. This may prevent devices from performing any mobile originated access attempts except for emergency calls.

Another example mechanism to control overload and/or manage congestion allows a MME/SGSN to reject ESM/SM requests from the UE with a Session Management back-off timer when ESM/SM congestion associated with the access point name (APN) is detected. The MME/SGSN may deactivate PDP/PDN connections belonging to a congested APN by sending the Deactivate PDP/PDN Context message to the UE with a Session Management back-off timer.

Another example mechanism to control overload and/or manage congestion is referred to as APN Based MM Congestion Control. When Congestion is detected for an APN, the SGSN/MME may reject attach requests from UEs that are subscribed to that APN with a MM back off timer. The UE shall not initiate any NAS request for Mobility Management procedures, except for emergency/priority services, while the MM back off timer is running.

Another example mechanism to control overload and/or manage congestion is referred to as General NAS level Mobility Management congestion control. Under general overload conditions, the MME/SGSN may reject Mobility Management signaling requests from UEs with a MM back off timer.

Another example mechanism to control overload and/or manage congestion is referred to as Throttling of Downlink Data Notification Requests. The MME/S4-SGSN can reject Downlink Data Notification requests for low priority traffic for UEs in idle mode. To further offload the MME/S4-SGSN, the MME/S4-SGSN can request the SGWs to selectively reduce the number of Downlink Data Notification requests it sends for downlink low priority traffic received for UEs in idle mode according to a throttling factor and a throttling delay specified in the DDN Ack message. The SGW determines whether a bearer is for low priority traffic or not on the basis of the bearer's ARP priority level and operator policy.

Another example mechanism to control overload and/or manage congestion is referred to as PGW/SGSN Control of overload. The PGW/GGSN may detect APN congestion based on criteria such as: a maximum number of active bearers per APN; and/or a maximum rate of bearer activations per APN. When under overload, the PGW/GGSN may reject PDN connection requests and may indicate a back-off timer to MME/SGSN. The MME/SGSN may try another PGW/GGSN for that APN before rejecting the PDN connectivity request.

Another example mechanism to control overload and/or manage congestion is referred to as Optimizing periodic TAU/RAU Signaling. To reduce network load from periodic TAU signaling, longer values of the periodic TAU/RAU timer and Mobile Reachable timer were introduced. A long periodic TAU/RAU timer value may be locally configured at MME/SGSN or may be stored as part of the subscription data in HSS/HLR. During Attach/RAU/TAU procedures the MME/SGSN may use the 'low access priority' indicator, operator policy and subscription data to determine the periodic TAU/RAU timer. A Subscribed Periodic RAU/TAU Timer may be stored as part of the subscription information in HSS/HLR and provided to the MME/SGSN.

Another example mechanism to control overload and/or manage congestion is referred to as GTP-C Load/Overload Control. A GTP-C based node, such as MME, SGW, or PGW for example, may communicate overload control information in order to mitigate overload situations for the overloaded node through actions taken by the peer node.

SUMMARY

The example congestion and overload control mechanisms that are summarized above are generic in nature and can be applied to non-MTC devices as well as MTC devices. These mechanisms were introduced mainly to protect the networks from congestion that may be caused by signaling and data from an unusually high number of devices/UEs. In the following disclosure, various issues with existing congestion and overload control mechanisms are recognized and described. In accordance with various embodiments, this disclosure describes various ways in which the 3GPP networks and the M2M service layer can coordinate and share information to efficiently and intelligently manage each other's congestion/overload states.

Systems, methods, and apparatus embodiments are described herein for managing congestion through coordination between core network nodes and M2M network nodes. In one embodiment, a service layer node includes a processor, a memory, and communication circuitry. The service layer node may be connected to a core network via its communication circuitry, and the service layer node may further include computer-executable instructions stored in the memory of the service layer node which, when executed by the processor of the service layer node, cause the service layer node to perform various operations. For example, the service layer node may receive an indication message associated with a congestion condition of the core network. The indication message may include one or more parameters corresponding to the congestion condition. The service layer node may select, based on the one or more parameters, an action to reduce activity on the core network. The service layer node may perform the selected action to reduce activity on the core network, thereby eliminating the congestion condition. In an example embodiment, the indication message is received from a machine type communication interworking function (MTC-IWF). In another example embodiment, the indication message is received from a policy and charging rules function (PCRF). The service layer node may perform the selected action by, for example, reducing a user plane data rate associated with a device connected to the core network; suspending the creation of new sessions; providing the core network with a list of devices that can be disconnected from the core network; terminating or modifying at least one session established over an Rx interface; and/or informing at least one device that the at least one device should reduce its user plane data rate, reduce its number of user plane connections, terminate at least one of its user plane connections, terminate its packet data network (PDN) connection until a backoff timer expires, or stop sending data over certain radio access technologies (RATs). The one or more parameters corresponding to the congestion condition may comprise at least one of an identity associated with the core network; an IP address range indicative of a portion of the core network associated with the congestion condition; a reduction parameter associated with an amount of congestion corresponding to the congestion condition; a type of load indicative of the selected action for reducing the activity, and a time duration associated with the selected action.

In another example embodiment, a service layer node may send a request that informs a node of the core network of an operation that the service layer node intends to perform. The operation may require resources of the core network. Based on the request, the service layer node may receive a message from the core network. For instance, the message may be received from the PCRF or the PGW. The message may indicate at least one of a time for the service layer node to perform the operation, a capability of the core network that can be used for the operation, or an indication that the required resources are reserved for the operation. The request may be sent when the service layer node determines that the operation requires a data rate that is greater than a predetermined threshold. Alternatively, the request may be sent when the service layer node determines that the operation triggers a number of devices that is greater than a predetermined threshold. The request may include an indication of at least one of, presented by way of example and without limitation: a type of a procedure that the service layer node intends to perform, a number of devices on which the service layer node intends to perform the procedure, a data rate that will be required for the procedure, a geographic area where devices on which the service layer intends to perform the procedure are located, an access point name (APN) that will be used for the procedure, a delay tolerance of the procedure, or one or more resources that should be reserved for the procedure.

In yet another example embodiment, a core network node may include a processor, a memory, and communication circuitry. The core network node may be part of a core network via its communication circuitry, and the core network node may further include computer-executable instructions stored in the memory of the core network node which, when executed by the processor of the core network node, cause the core network node to receive a first request associated with a congestion condition of a service layer node. The request may include one or more parameters corresponding to the congestion condition. Based on the one or more parameters, the core network node may determine a first device to disconnect from the service layer node, and the core network node may detach the first device from the service layer node. The one or more parameters may include an idle mode parameter that instructs the core network node to detach the first device. The one or more parameters may include a disconnection list that indicates a plurality of devices that should be immediately disconnected from the core network upon receipt of the first request, and the disconnection list may include the first device. The one or more parameters may include a vulnerability list that indicates a plurality of devices that can be detached from the core network to allow higher priority devices to access the service layer node, and the vulnerability list may include the first device. In one example, the one or more parameters may include a back off timer indicative of a time period after which the first device can attempt to reattach to the service layer node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings, wherein like reference numbers refer to like elements, and wherein.

DETAILED DESCRIPTION OF ILLUSTRATIVE EMBODIMENTS

Figure 1A:
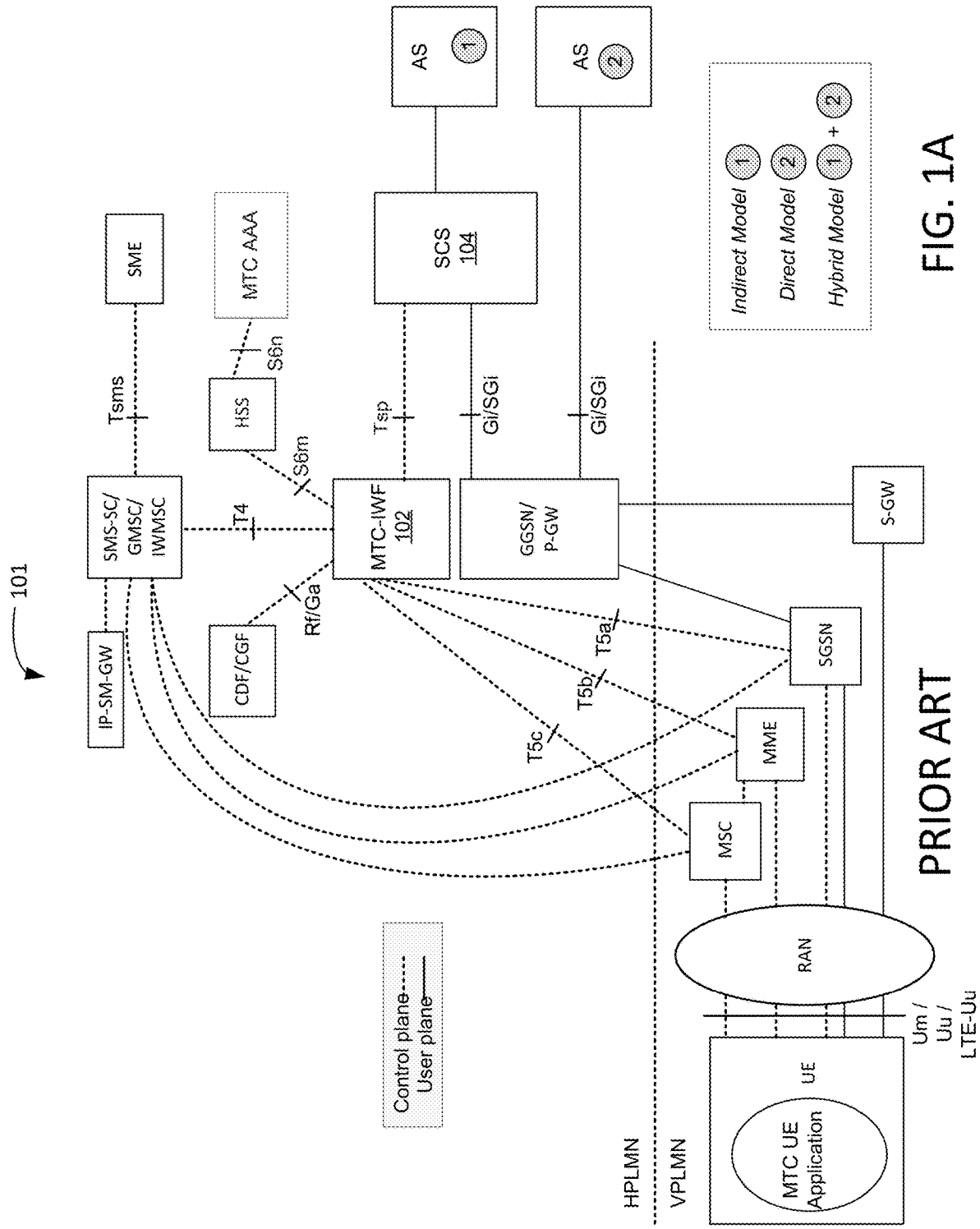
FIG. 1A is a system diagram that shows an example 3GPP architecture for machine-type communication (MTC)

The example congestion and overload control mechanisms that are summarized above are generic in nature and can be applied to non-machine type communications (MTC) devices as well as MTC devices. These mechanisms were introduced mainly to protect the networks from congestion that may be caused by signaling and data from an unusually high number of devices, which can be referred to as user equipment (UEs) without limitation. In the following disclosure, issues with existing congestion and overload control mechanisms have been recognized. For example, the configuration of the MTC devices, such as 'low access priority' for example, is either pre-configured on the UE/Universal Subscriber Identity Module (USIM) or performed via Open Mobile Alliance-Device Management (OMA-DM) or USIM over the air (OTA) procedures. This information is not currently available in the subscription information stored in the Home Subscriber Server (HSS) or the Home Location Register (HLR), which can be collectively referred to as the HSS/HLR for convenience. Thus, the network cannot identify a 'low access priority' device unless the device indicates the low access priority in the Network Access Server (NAS) or Radio Resource Control (RRC) procedures.

Another example issue associated with existing mechanisms that has been identified herein is that when a UE connects with 'low access priority' to a Packet Data Network (PDN), the access priority cannot change until the PDN connection is deactivated. The network or the service layer cannot change the low priority associated with the PDN connection dynamically and the low priority PDN connection is susceptible to be dropped during congestion.

Yet another example issue with existing mechanisms that has been identified herein is that the 'low access priority' indicator just indicates that the device is delay tolerant, and it does not have a priority value associated with it. During congestion, new RRC/SM/MM procedures may be rejected and some of the existing RRC/SM/MM connections from MTC devices may be released until the congestion is reduced. In some cases, the connections to be released are chosen solely based on the 'low access priority' indicator, and this may cause some relatively high priority (with regard to the service layer) M2M connections to be released and some relatively low priority M2M connections to be retained.

The problem of congestion and overload that can be caused by a large number of MTC devices is not only an issue for the 3GPP networks. It is also can be a problem for an application function (AF) or service capability server (SCS) or Application Service (AS), which can be referred to collectively as an AF/SCS/AS or as any variation thereof, such as an M2M service layer for example. Although the M2M service layer may have some overload control mechanisms at the service layer, it can benefit from coordinating with the underlying networks.

For example, as further described below, the M2M service layer and a 3GPP network can coordinate with each other to help manage congestion in the mobile network and at the service layer. As described below, the M2M Service Layer can provide assistance to the 3GPP core network (CN) for intelligently managing M2M devices during overload/congestion periods. As further described below, the 3GPP CN can provide services to the M2M Service Layer to help manage service layer congestion. In addition, as described herein, the Service Layer and Core Network can better coordinate their activities so that M2M devices are most active at times when the mobile network has available resources.

In accordance with various embodiments, described herein are various methods for which the 3GPP networks and the M2M service layer can coordinate and share information to efficiently and intelligently manage each other's congestion/overload state.

As described above, the core network has different mechanisms in place to manage its congestion. Some new methods are described herein, for example, in which the SCS can support controlling and managing the core network overload.

Figure 1B:
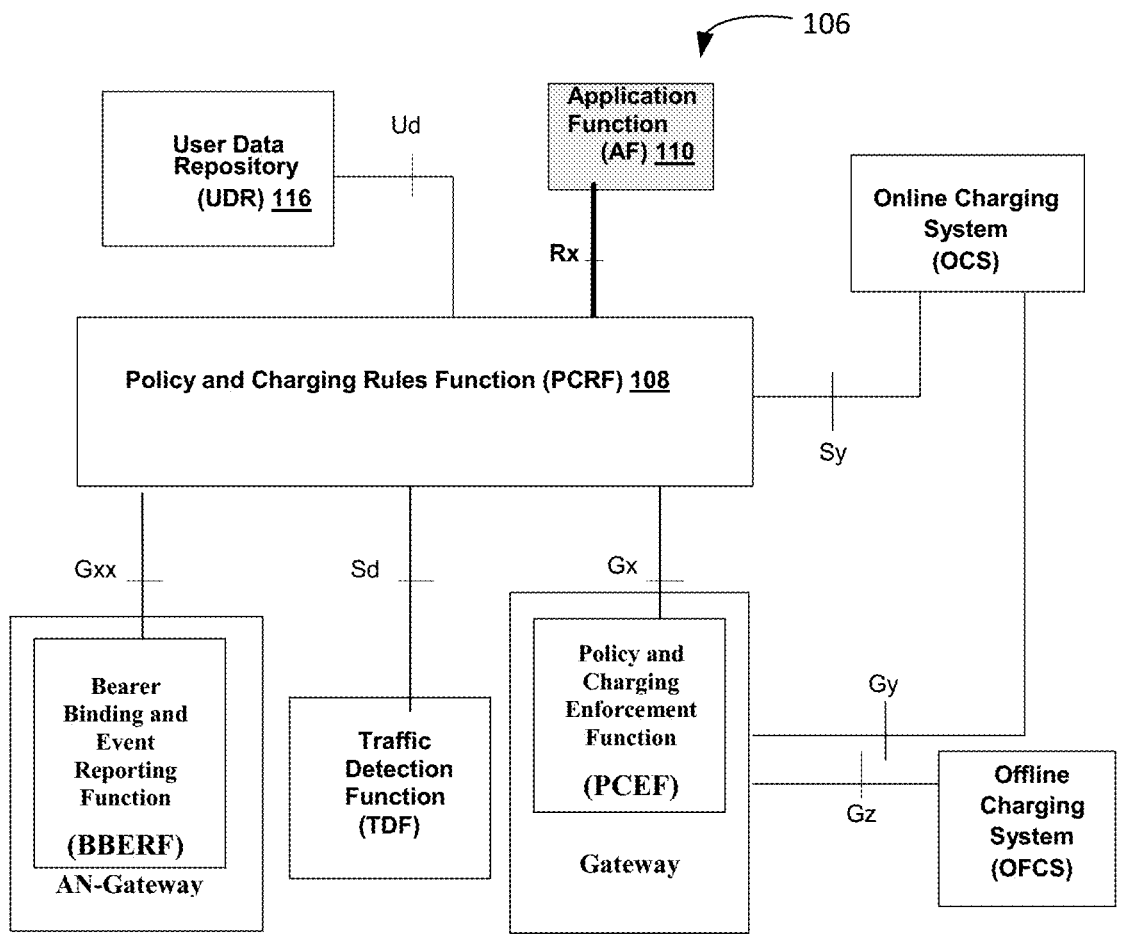
FIG. 1B is a system diagram that shows an example Policy and Charging Control (PCC) architecture in a 3GPP system.

According to an example embodiment, referring generally to FIGS. 1A and 1B, when a PDN Gateway (PGW) identifies Access Point Name (APN) level congestion, it can inform the SCS via the PCRF over the Rx interface (e.g., to the AF of the SCS), or the MTC-IWF over the Tsp interface. The CN can provide the congestion parameters and the acceptable levels as described further below. The SCS may perform some actions to reduce the CN congestion. Example actions include, without limitation, commanding the UEs over the user plane to disconnect, detach, delay or reduce their user plane activities; providing a list of devices for PDN connection termination; suspending any AF session creation or modification; and reducing a user plane data rate.

In accordance with another embodiment, the PGW may inform the SCS about the user plane data rate based congestion and provide information about the specific devices that are heavily affected. The SCS may help in the general data rate reduction and/or the data rate of the specific devices. The SCS may reschedule its data communication or plan its data communication for a later time. An example method for rescheduling is described below.

In various other example embodiments, a Mobile Management Entity (MME) provides a congestion indication to the SCS via the MTC-IWF when: the MME detects congestion that is APN based; a GTP-C based load/overload indication is received from the Serving Gateway (SGW)/PGW, Downlink Data Notification (DDN) based congestion is indicated by the SGW, and/or other internal MME based congestion identification mechanisms occur. Example methods for providing such congestion indications are described below.

In various other example embodiments described herein, the core network provides assistance in SCS overload control. The SCS can use different methods for service layer overload control. Described herein are methods in which the core network can assist in managing and controlling the SCS overload such as, for example, when the SCS has a relationship with the core network (e.g., see FIG. 1A). For example, when there is an overload situation at the SCS, the SCS can request that the core network, via the Tsp reference point, disconnect M2M devices, prevent devices from accessing the SCS, and/or temporarily delay new connections to the SCS, as described below. As also described below, the SCS can provision certain congestion threshold parameters in the CN via the Mh reference point or via the Tsp reference point. The parameters may enable the CN to enforce restrictions or policies that prevent an SCS overload. The SCS can provision the parameters such as, for example, the maximum devices that should be allowed to connect to the SCS, the maximum data rate that can be handled by the SCS, or the like.

In various embodiments described herein, SCS procedures are based on a CN load. Some SCS procedures, such as bulk device triggering for example, can cause overload at the CN. Described below is an example method by which the SCS informs the core network over the Tsp reference point about the procedures that it intends to perform. The core network can, for example and without limitation, reserve resources for the procedure, provide the SCS with a better time for executing the procedure, or indicate how much of the procedure can be handled by the core network based on the current load. This can help in avoiding CN overload, and can improve the chances of success for SCS procedures.

Another example embodiment includes MTC information provisioning for congestion control. The SCS may provide the core network with M2M UEs' Low Access Priority (LAP) information and emergency information via the Mh reference point or via the Tsp reference point. This information can be used to allow the CN to properly handle the M2M device during overload. An example method for provisioning this information by the SCS in the CN is described below. Further, example new MTC information that can be maintained at the core network is listed below.

As described above, the 3GPP core network and the M2M service layer can coordinate with each other to produce effective and intelligent congestion control mechanisms. Both the 3GPP core network and the M2M service layer may benefit by sharing congestion and overload control information as described herein. This disclosure explores the following areas, presented by way of example and without limitation, to achieve mutual congestion coordination: overload control mechanisms in the CN with service layer coordination; overload control mechanisms in the Service Layer with CN coordination; approaches for avoiding overload where the M2M service coordinates/schedules its activity with the CN network; updates to the UE subscription information that is maintained in the HSS/UDR; and updates to the SCS subscription information that is maintained in the CN.

FIGS. 2-10 (described hereinafter) illustrate various embodiments of methods and apparatus for managing congestion and overload conditions. In these figures, various steps or operations are shown being performed by one or more functions, devices, gateways, and/or servers. It is understood that the functions, devices, gateways, and servers illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 11C or 11D described below. That is, the methods illustrated in FIGS. 2-10 may be implemented in the form of software (e.g., computer-executable instructions) stored in a memory of a network node, such as for example the node or computer system illustrated in FIG. 11C or 11D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 11C and 11D, respectively) of the node under control of the processor of the node and the computer-executable instructions (e.g., software) that it executes. For example, it may be possible for any node in the core network to experience congestion or to identify a congestion situation in the network. In accordance with various embodiments described below, with reference to FIGS. 2-7, the service layer (e.g., SCS) can assist different nodes of the CN in congestion control.

In one embodiment, a PGW can support multiple PDNs and can identify overload on a PDN/APN basis. The overload situation on an APN may prevent further PDN connection activations or bearer resource creations and modifications. The PGW may still be able to support data communication on the existing bearers and PDN disconnections from the UE. Described below is an example in which a SCS can assist the PGW in this overload situation.

In some cases, a PGW may detect a data rate based congestion situation that causes a large number of packets to be dropped. This overload condition may or may not be disruptive to the PGW, for example, to prevent the PGW from handling an ESM procedure such as a PDN connection activation or bearer resource modifications. However, this situation may affect some data communications and the Quality of Experience (QoE). Described below are methods for handling this scenario with coordination from the SCS in accordance with an example embodiment.

Figure 2:
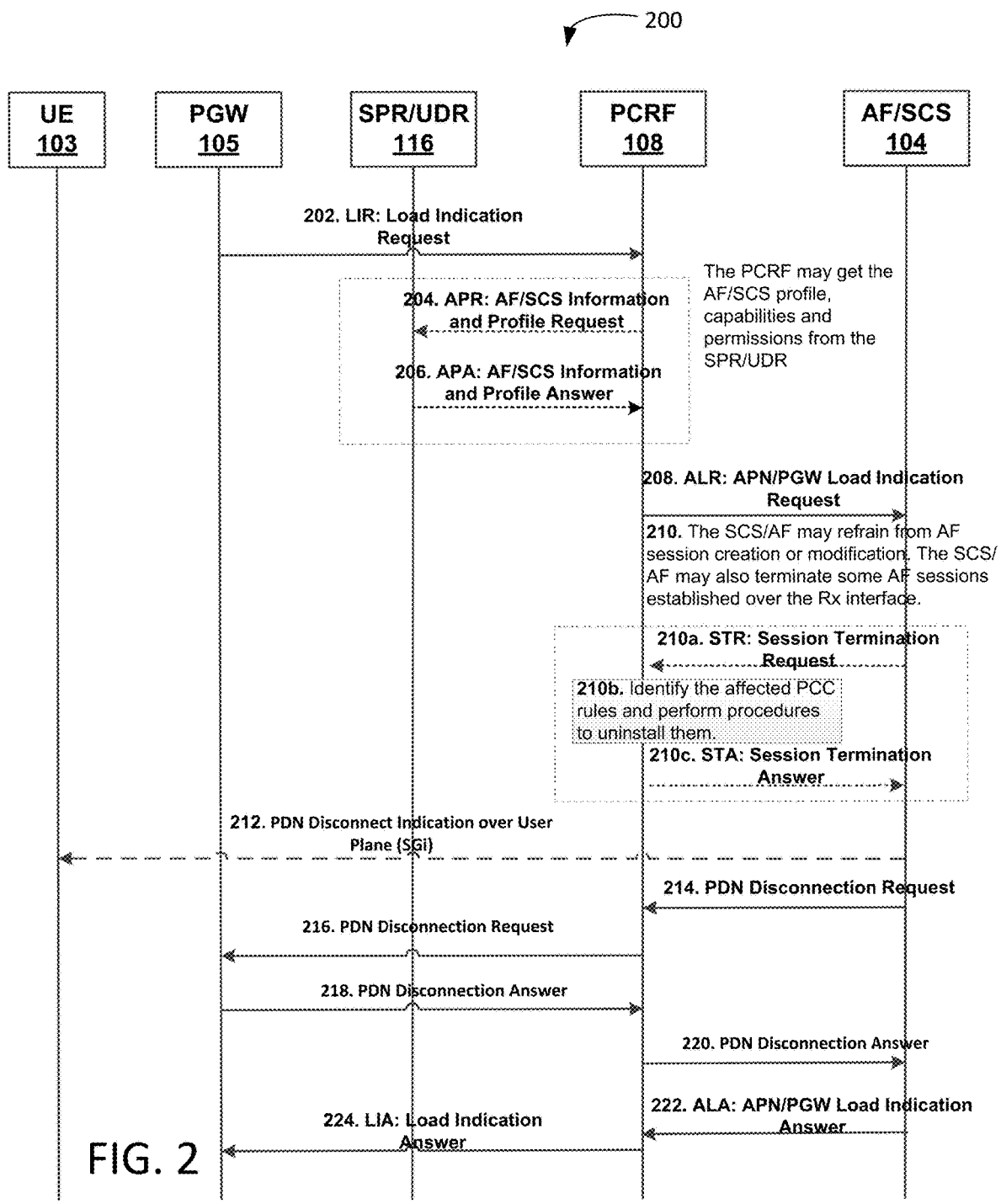
FIG. 2 is a flow diagram that shows an example call flow in which an receiver (Rx) interface informs a services capability server (SCS) about congestion in accordance with an example embodiment.

In one embodiment, an approach for addressing the case where the PGW has identified APN level congestion is implemented. Referring to FIG. 2, a scenario is illustrated in which the PGW indicates to the PCRF that there is APN level congestion. The PGW also informs PCRF of the cause of congestion. In accordance with the illustrated embodiment, the PCRF then uses the Rx interface to inform the AF/SCS of the condition, and the AF/SCS addresses the issue by terminating data flows or PDN connections via the Rx interface. User plane bearers may also be reduced by the SCS commanding devices over user plane to terminate bearers, disconnect from the PDN, and/or shut down.

Figure 3:
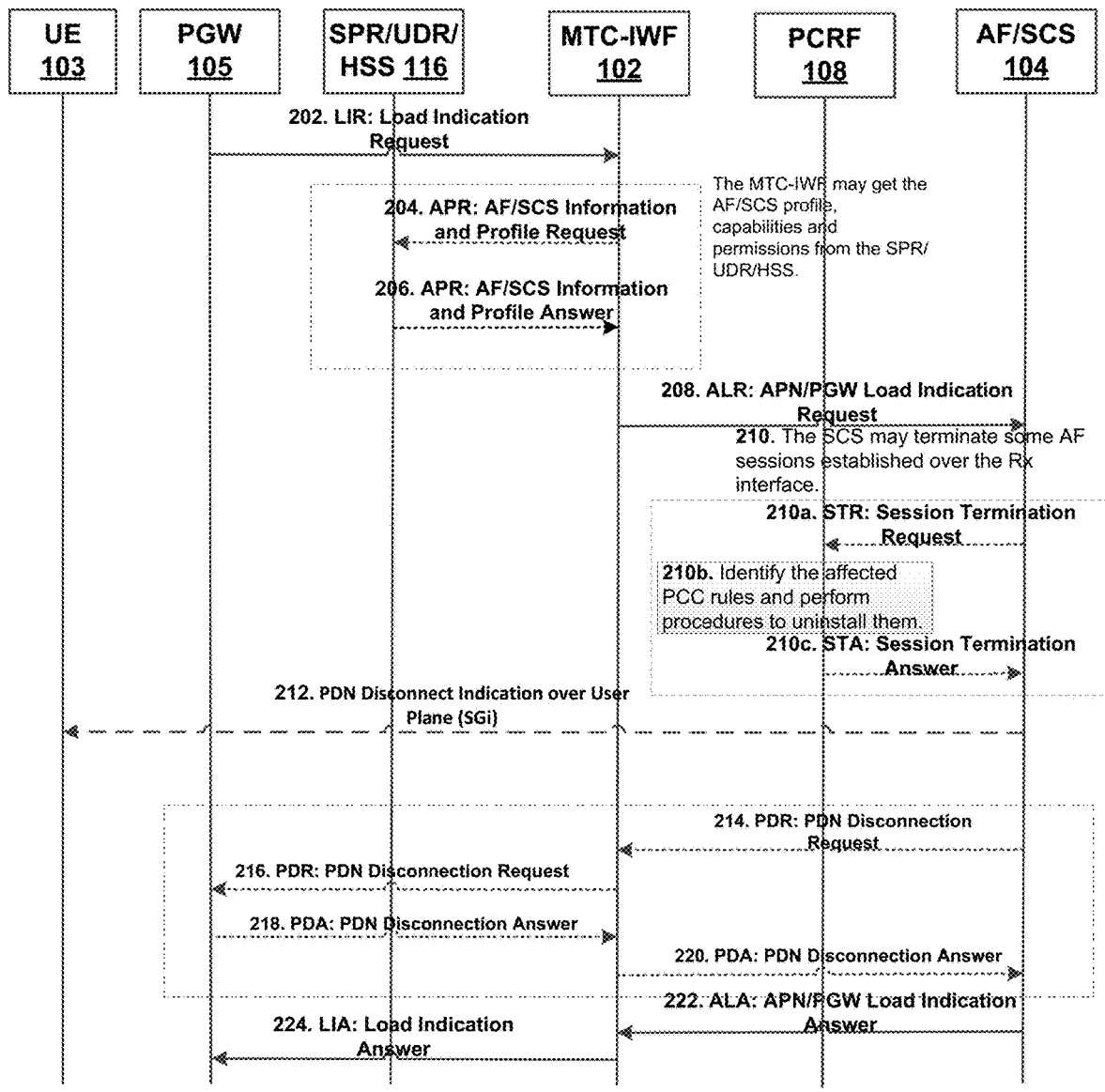
FIG. 3 is a flow diagram that shows an example call flow in which a Packet Data Network (PDS) Gateway (PGW) transmits an access point name (APN) load indication to the SCS via a machine type communications interworking function (MTC-IWF) in accordance with an example embodiment.

Referring to FIG. 3, an alternative embodiment is illustrated in which the PGW sends an APN load indication to the SCS via the MTC-IWF instead of via the PCRF. In some cases, if the congestion is mainly caused by high data rate, then the procedure described with reference to FIG. 4 (described in detail below) can be performed. An APN may be hosted on a single PGW or it may be served by multiple PGWs. A PGW may also be configured to serve more than one APN. A PGW can detect APN congestion and may initiate overload control procedures, such as the overload control procedures described in 3GPP TS 23.401, "General Packet Radio Service (GPRS) enhancements for Evolved Universal Terrestrial Radio Access Network (E-UTRAN) access," which is incorporated by reference as if the disclosure of which is set forth in its entirety herein. APN congestion detection may be based on different criteria such as, for example, a maximum number of active bearers for an APN, a maximum rate of bearer activation per APN, or the like. When congestion is detected on an APN, for example, the PGW may reject PDN connections. The PGW may also indicate the congestion state to MME. Such an indication may stop new PDN connections to the PGW for that APN, for example, until a specified amount of time has expired. The PGW may also employ GTP-C load/overload control mechanisms, such as those specified in Release 12 of 3GPP TS 23.401, which is referenced above. The congestion control mechanisms that are currently available to the core network are "brute-force" methods. The application (or service) layer may have no warning before connections are dropped and/or rejected. Also, the application (or service) layer may not be able to provide any guidance to the core network as to what connections are lower in priority. Thus, the core network is currently left to decide what flows to drop or reject without knowing what applications are running on the device.

In various embodiments described herein, the PGW can indicate its load/overload status to the SCS. Thus, the packet data network (PDN) gateway (PGW) can let the SCS perform some actions that can help in reducing the overload state of the PGW/APN. The PGW can send the load indication to the PCRF and the PCRF can forward the details to the AF/SCS. Alternatively, the load indication can also be sent to the SCS via the MTC-IWF. For example, the MTC-IWF approach may be used where an AF is not provided by the SCS.

There are multiple communication scenarios that may include various entities such as, for example, the UE, PGW, APN, and the SCS. For example, a given UE can communicate with one or more SCSs using one or more APNs that are maintained by one or more PGWs. This section describes the scenario where the congestion is on an APN level. The CN may provide the APN load indication to each of the SCSs that are present in the APN and have congestion coordination with the CN enabled. In an example embodiment, the CN gets this SCS list based on the SCS subscription information listed below. The SCSs, upon receiving the load indication message, may reduce the activity on the affected APN and for the UEs that are connected to the SCS via the affected APN.

In accordance with an example embodiment, if the APN is served by multiple PGWs and if overload occurs in one of the PGWs, then the SCS may be provided with the IP address range of the APN that is hosted by the PGW. The SCS can choose to reduce the activity on the affected PGW, for example only on the affected PGW.

The CN may provide an indication to the SCS about the cause of the congestion and the action that is required from the SCS. The CN can provide its congestion level and the SCS can proportionally reduce its activity. For example, if the CN needs to terminate some amount of sessions, then it can provide the exact number of sessions that each SCS in the PDN would have to terminate. Alternatively, the CN may provide a percentage value so that each SCS can reduce their number sessions in proportion to the provided percentage value. In accordance with various embodiments, the SCS can perform various actions, such as, for example, providing a user plane indication, initiating a PDN disconnection, avoiding an AF session creation or modification, or terminating an AF session.

With respect to providing a user plane indication, the SCS can inform the device (e.g., a UE) over the user plane to reduce its activity on the APN. The SCS can command the UE to disconnect from a PDN, detach from the network, refrain from any bearer creation on the PDN, use an alternate APN, or any appropriate combination thereof. The SCS can also provide a back off timer to indicate when the device may reconnect. Under APN congestion, the PGW can still support data transfers on the existing bearers and can handle PDN disconnection requests from the UE (e.g., see 3GPP TS 23.401). The SCS may send this indication over the user plane on one of the existing bearers or via an alternate path (if one exists) such as Wi-Fi, WiMAX, or the like.

With respect to SCS Initiated PDN Disconnection, in accordance with an embodiment described herein, the SCS may be given the permissions to terminate the PDN connections of a UE. The SCS may then provide a list of devices for which PDN connection can be terminated. For example, the SCS can provide this list via the AF on the Rx interface to PCRF. The PCRF may pass this list to the PGW or via the MTC-IWF to the PGW so that the PGW can disconnect their PDN connection. By way of example, M2M devices/UEs may be configured to register and communicate with a SCS, for example only one SCS, and the SCS may have control over the device. For example, the SCS may decide when communication can be established and when the connections can be terminated. Thus, in such scenarios where the SCS has complete authority over a M2M device, for example, the SCS can be given the permission to terminate the PDN connection made by an M2M device/UE. In accordance with an example embodiment described below, the subscription information of UEs that is maintained on the HSS/SPR/UDR can be configured to mention the SCS(s) that are allowed to terminate the PDN connection of the UE. If the SCS indicates that the PDN connection of a UE can be terminated, the PCRF can check if the requesting SCS has the permissions to terminate the PDN connection of the indicated UE, and can forward the request to the PGW. The PGW can drop the PDN connection and other dedicated bearers of the UE associated with that PDN connection. It will be appreciated that this may help the PGW in reducing the number of active bearers.

With respect to avoiding AF Session Creation/Modification, in accordance with an example embodiment, the AF/SCS can refrain from creating new AF sessions or modifications to existing AF sessions. The CN can provide a back-off time period during which the SCS/AF may not try to attempt any AF initiated session creation or modification.

With respect to AF Session Termination, in one embodiment, the SCS can choose to terminate some of the applications that have AF sessions. The SCS can provide the application details to the AF and have the AF terminate the AF sessions via the Rx interface. An example AF session termination procedure is described in 3GPP TS 29.214, "Policy and Charging Control over Rx reference point," which is incorporated by reference as if set forth herein.

Referring now to FIG. 2, an example network 200 includes a UE 103, a PGW 105, an SPR/UDR 116, a PCRF 108, and an SCS 104. It will be understood that the SCS 104 may also be referred to as an M2M service layer, a network node, an application server, an application function, or a AF/SCS without limitation. It will also be understood that the SCS may have internal logic that maps API requests from internal SCS services to requests that are directed to core network nodes, such as the PCRF and MTC-IWF for example. The SCS may also have internal logic that creates API requests to internal SCS services from requests that are directed towards the SCS from core network nodes, such as the PCRF and MTC-IWF for example. The logic that maps core network node interactions and SCS API requests may be referred to as a Service Capability Exposure Function (SCEF). Similarly, it will be understood that the UE 103 may include an M2M device or any other MTC device as desired. Thus, it will be appreciated that the example network 200 is simplified to facilitate description of the disclosed subject matter and is not intended to limit the scope of this disclosure. Other devices, systems, and configurations may be used to implement the embodiments disclosed herein in addition to, or instead of, a network such as the network 200, and all such embodiments are contemplated as within the scope of the present disclosure. It will further be appreciated that reference numbers may be repeated in various figures to indicate the same or similar features in the figures.

At 202, in accordance with the illustrated embodiment, a load indication request (LIR) is sent. The LIR may include a new message that is sent on the diameter based Gx interface. For example, as shown, when the PGW 105 detects that the total number of bearers is close to the maximum bearers that can be supported, the PGW 105 informs the PCRF 108 by sending the Load Indication Request message, at 202. The PGW 105 may include various information elements (IEs) in the message. Example IEs include, without limitation:

Cause, which may indicate the condition that caused the overload.
Total Active Bearers, which may indicate the number of bearers that are currently active on the APN.
Affected APN, which may indicate an identifier associated with the affected APN. In some cases, a list of APNs may be provided, for example, if the entire PGW 105 is affected.
Maximum Active Bearers, which may indicate a threshold value associated with the maximum value that the PGW 105 can support.
Desired Number of Bearers, which may indicate a desired number of bearers, which may further indicate to the PCRF 108 how many bearers may need to be terminated.
Back-Off Timer, which may indicate the time duration for which the AF/SCS 104 has to hold back new AF session initiations or AF session modifications.

There may be multiple sets of the above example IEs, for example, if multiple APNs are affected. The PCRF 108 may determine if the load indication has to be provided to a given SCS. In an example embodiment, the PCRF 108 may be configured with the list of SCSs in an APN. Alternatively, the PCRF 108 may get the details from the SPR/UDR 116.

At 204, in accordance with the illustrated example, an AF/SCS Information and Profile Request (APR) message is sent on the Sp/Ud interface. As shown, the PCRF 108 may send the APR message to the SPR/UDR 116 to get the list of SCSs 104 that are available in an APN. The APR message may contain the 'Affected APN' IE described above. The SPR/UDR 116 may check subscription information associated with SCSs 104 to determine which SCSs have subscribed to the indicated APN. This field is further described below. In one embodiment, the SPR/UDR 116 can also maintain a separate list of SCSs per APN instead of checking each of the subscription information associated with each SCS.

At 206, in accordance with the illustrated embodiment, an AF/SCS Information and Profile Answer (APA) command, which is a new message described below, is sent on the Sp/Ud interface. The SPR/UDR 116 may send the APA message, which may contain the list of SCSs and the related subscription information for each of the SCSs. The subscription information associated with each of the SCSs may contain the permissions and capabilities of each of the SCSs. For example, the information may convey if a given SCS has the capability to support load reduction on an APN basis and if a given SCS has permissions for deactivating PDN connections of UEs. In some cases, the PCRF 108 can decide how congestion may be mitigated based on policies and the retrieved information about the method that is to be employed for the load reduction. In some cases, the PCRF 108 may allow the AF/SCS to choose the bearers/devices that can be disconnected.

Still referring to FIG. 2, at 208, in accordance with the illustrated embodiment, an APN/PGW Load Indication Request (ALR) command is sent on the diameter based Rx interface. The PCRF 108 sends the load indication message to each of the SCSs (e.g., SCS 104) that has been chosen from the list received in the APA message (previous step) from the SPR/UDR 116. This message may contain various information, such as for example and without limitation: APN/PDN information; an IP Address Range; a percentage/volume of reduction; a type of load reduction; a time duration, and a back-off timer.

The APN/PDN information may indicate the affected APN name, the PDN ID, or the IP domain ID. With respect to the IP Address Range, by way of example, if only a part of the PDN is affected, then for each PDN the PCRF 108 may indicate the affected IP address range. The SCS 104 may choose devices (e.g., UE 103) that fall into this range for load reduction. With respect to the percentage/volume of reduction, if only one SCS was contacted for example, then the PCRF 108 can provide the exact number of PDN connections that need to be dropped. If multiple SCSs are involved, for example, then the SCS 104 can provide the percentage value that needs to be reduced. The PCRF 108 can determine this percentage value based on the current total, desired active bearers, and/or maximum bearers value provided by the PGW 105 at 202. The type of load reduction may indicate the approach that the SCS 104 may use for reducing the active bearers. Possible approaches comprise terminating AF sessions over the Rx interface, disconnecting devices over the Rx interface, or instructing devices to disconnect, reduce their number of user plane bearers, reduce their data rate, or hold back AF session creations/ modifications. The Time Duration may indicate the time period for the SCS 104 to reduce the load and send a report back to the PCRF 108. Each load reduction type can have separate time periods. For example, the user plane method may have a longer duration for execution that the PDN disconnection method (where the SCS provides a list of devices). A value associated with the Back-Off Timer may be included if AF initiated session modifications/creations are to be temporarily suspended. Depending on the capabilities of the SCS 104 and the indications from the PCRF 108, for example, the SCS 104 may choose one or more methods of activity reduction on the affected APN.

Continuing with reference to FIG. 2, at 210, the SCS 104 may choose to terminate AF sessions that were previously established. For example, an AF initiated session termination procedure 210*a-c* can be performed as described in 3GPP TS 29.214, referenced above. This procedure may help in reducing the number of active bearers as the corresponding PCC rules get modified/un-installed.

At 212, in one example, the SCS 104 may choose the user plane method. Thus, the SCS 104 may send an application layer message to command the UE 103 to disconnect bearers, reduce its activity, or completely disconnect from a PDN and detach. In order to assist the UE 103, in some cases the SCS 104 may provide the UE 102 with information. For example, the UE 103 may be provided with an indication and a backoff time that will cause it to stop sending data until the backoff timer expires. The UE 103 may be provided with an indication and a backoff time that will cause it to detach its PDN connection until the backoff timer expires. The UE 103 may be provided with an indication and a maximum data rate that will cause the UE 103 to limit its uplink (UL) traffic so that its UL data rate does not exceed the rate that was provided by the SCS 104. The UE 103 may be provided with an indication that will cause the UE 103 to stop sending data over the user plane (its IP connection) and limit its uplink data transmission to small data packets that can be carried in SMS, RRC, or NAS messages. The UE 103 may be provided with an indication that will cause the UE 103 to stop sending data over certain radio access technologies (RATs) and limit its uplink data transmission to other RATs.

At 214, as shown, the SCS 104 can send a 'PDN Disconnection Request' message via the AF 104 to the PCRF 108. This message may include a list of devices for which the PDN connection can be terminated. By way of example and without limitation, this message may include a list of devices and a priority. With respect to the list of devices, the AF/SCS 104 may provide an identity associated with a plurality of devices. For example, the identity may be an IP address of a given UE or it may be the external identifier of the UE. In some cases, an external identity may be used when the SCS 104 does not know the IP address assigned to the UE, or if the SCS 104 thinks that the IP address that it knows (of the UE) may be invalid. The PCRF 108 may interface with the HSS to translate the external identifier into an internal UE identifier, such as an IMSI for example. The SCS 104 can provide each device with a priority value.

At 216, in accordance with the illustrated example, the PCRF 108 may check the permissions of the SCS 104 to disconnect a UE's PDN connection and send the authorized list to the PGW 105. The PGW 105 may disconnect the UEs to reduce the overload condition on the APN. At 218, the PGW 105 sends a 'PDN Disconnection Answer' message to indicate that it has handled the request. At 220, in accordance with the illustrated embodiment, the PCRF 108 sends a PDN Disconnection Answer message back to the SCS 104. At 222, in accordance with the illustrated embodiment, an APN/PGW Load Indication Answer (ALA) is sent on the diameter based Rx interface. At 222, using the ALA message, the SCS/AF 104 can provide a report on the actions that were taken to reduce the PDN overload condition. At 224, a Load Indication Answer (LIA) message is sent to the PGW 105 from the PCRF 108. In one example, the LIA message is sent on the diameter based Gx interface. In some cases, the PCRF 108 can consolidate the report from different SCSs and send it to the PGW 105 using the LIA message, at 224.

Referring now to FIG. 3, in accordance with an alternative embodiment, the load indication at 202 from the PGW 105 can be indicated to the SCS 104 via the MTC-IWF 102. The PGW 105 can send the load indication to the MTC-IWF 102 and can provide the MTC-IWF 102 with the APN, the IP address range, or a combination thereof. At 204, the MTC-IWF 102 can check with the HSS 116 to determine the list of SCSs (as described with reference to FIG. 2), and the MTC-IWF 102 may receive the list at 206. As illustrated, the MTC-IWF 102 may send the load indication to the SCSs over the Tsp reference point (at 224).

Thus, as described above with reference to FIGS. 2 and 3, a service layer node, for instance the SCS 104, may comprise a processor, a memory, and communication circuitry. The service layer node may be connected to a core network via its communication circuitry, and the service layer node may further comprise computer-executable instructions stored in the memory of the service layer node which, when executed by the processor of the service layer node, cause the service layer node to perform various operations. For example, referring generally to 208, the service layer node may receive an indication message associated with a congestion condition of the core network. The indication message may include one or more parameters corresponding to the congestion condition. The service layer node may select, based on the one or more parameters, an action to reduce activity on the core network. The service layer node may perform the selected action to reduce activity on the core network, thereby eliminating the congestion condition. In an example embodiment, referring to FIG. 3, the indication message is received from a machine type communication interworking function (MTC-IWF), for instance the MTC-IWF 102. In another example embodiment, referring to FIG. 2, the indication message is received from a policy and charging rules function (PCRF), for instance the PCRF 108. As also described above, the service layer node may perform the selected action by, for example, reducing a user plane data rate associated with a device connected to the core network; suspending the creation of new sessions; providing the core network with a list of devices that can be disconnected from the core network; terminating or modifying at least one session established over an Rx interface; and/or informing at least one device (e.g., see 212) that the at least one device should reduce its user plane data rate, reduce its number of user plane connections, terminate at least one of its user plane connections, terminate its packet data network (PDN) connection until a backoff timer expires, or stop sending data over certain radio access technologies (RATs). As further described above, the one or more parameters corresponding to the congestion condition may comprise at least one of an identity associated with the core network; an IP address range indicative of a portion of the core network associated with the congestion condition; a reduction parameter associated with an amount of congestion corresponding to the congestion condition; a type of load indicative of the selected action for reducing the activity, and a time duration associated with the selected action.

In one example, as described in detail below, a service layer node may provide the core network with low access priority information associated with a device, for instance a first device, connected to the core network, such that the core network can handle the first device in accordance with the low access priority information during the congestion condition. By way of another example, a service layer node may provide the core network with emergency information associated with device, for instance a second device, connected to the core network, such that the core network can handle the second device in accordance with the emergency information during a congestion condition.

Figure 4:
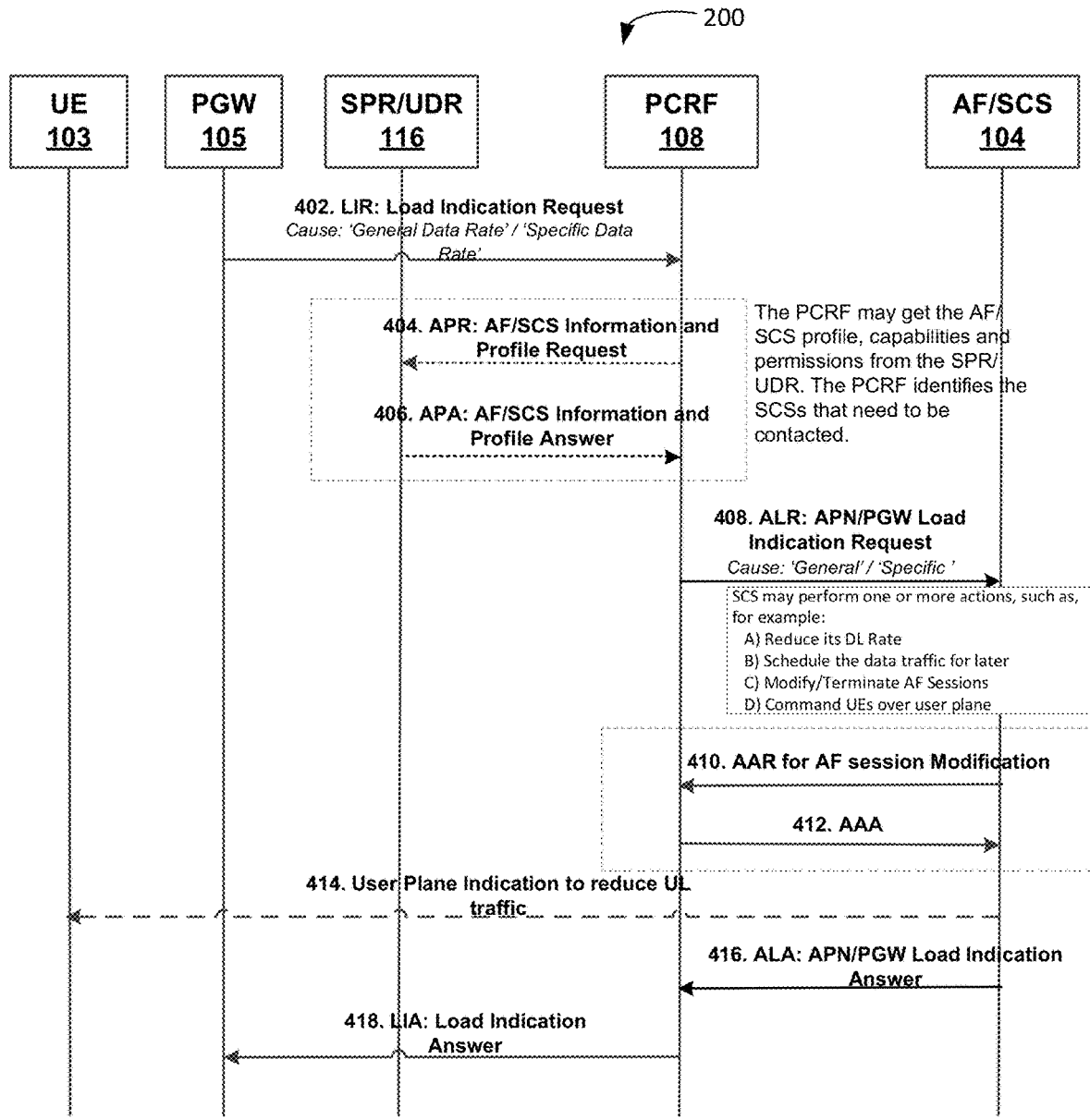
FIG. 4 is a flow diagram that shows an example call flow in which the PGW indicates to a policy and charging rules function (PCRF) that there is a data rate based congestion condition in accordance with an example embodiment.

In an example embodiment, congestion scenarios that are caused by a high data rate of downlink or uplink data are addressed. FIG. 4 shows an example scenario in which the PGW 105 indicates to the PCRF 108 that there is a data rate based congestion condition. In accordance with the illustrated embodiment, the PCRF 108 uses the Rx interface to inform the SCS 104 of the congestion condition, and the SCS 104 addresses the congestion issue by reducing its activity on the user plane (SGi). The SCS 104 may reduce the user plane data rate by reducing its downlink data rate or by terminating AF sessions. The SCS may also instruct the UEs (e.g., the UE 103) to reduce their uplink data rate, disconnect some bearers, or detach from the network.

As described herein, downlink congestion may be reduced. For example, the PGW 105 can experience congestion on a user plane due to the rate of user plane data that is received on the downlink from the SCS 104 side. Under such scenarios, the packets may be dropped to throttle the data rate. Thus, the non-GBR bearers may be affected because their data rate may be reduced to sustain the GBR bearers. In some cases, many M2M devices with limited communication needs are expected to use only non-GBR bearers for their communication and they may get affected under PGW overload scenarios.

In an example described herein, when the PGW 105 experiences congestion due to the rate of downlink data, it indicates the congestion status to the SCS 104. This indication may serve one or more purposes. For example, the indication may let the SCS 104 reduce its downlink data toward the PGW 105 so that the PGW 105 can better support other non-GBR bearers (from human controlled UEs or other important M2M communications). By way of another example, the indication may let the SCS 104 delay its traffic until a later point in time to avoid packet losses towards its devices.

The PGW 105 can provide the list of devices (UEs) for which a number of packets are dropped due to congestion. The PGW 105 can also provide a general downlink (DL) data rate overload indication to the PCRF 108. If a list of devices is provided, for example, the PCRF 108 can identify the corresponding AF/SCS and provide the congestion indication to the corresponding AF/SCS. In a case of general DL congestion, for example, the PCRF 108 can contact known SCSs, for instance all known SCSs, in the APN and provide the IP address range hosted on the PGW 105. The SCSs can then reduce their traffic or schedule the traffic for a later time. In an example embodiment, if a given SCS needs to be informed when the PGW 105 drops packets for specific UEs, then this information is configured in the PGW 105. This configuration can be implemented in the UE's subscription information or it can be dynamically configured via an AF session on the Rx interface. The PCRF 108 may configure the PGW 105 when an IP CAN session gets established concerning congestion reporting for that specific IP CAN session or UE.

In various example embodiments, uplink (UL) data rate congestion is reduced. For example, the PGW 105 may experience congestion on the user plane due to the rate of uplink user plane data that is received from the UE side. Under such a scenario, the PGW 105 may drop packets for non-GBR bearers and for GBR bearers that have a maximum bit rate (MBR) that is greater than the guaranteed bit rate (GBR). It will be understood that packets that are dropped may have adverse effects on M2M device communications. The uplink congestion may be due to some of the UEs performing high UL data transfer or by a large number of UEs attempting data transfer, for example.

In an example embodiment described herein, referring generally to FIG. 4, the PGW 105 provides an UL congestion indication to the PCRF 108 and has the PCRF 108 communicate this to the SCS 104. The SCS 104 may be informed of general UL based congestion on a particular PGW (e.g., via an IP address range) or an APN (e.g., via a PDN ID). The SCS 104 may also be informed of specific devices that are causing congestion. In an example general UL congestion case, the PCRF 108 may contact one or more known SCSs, for instance all the known SCSs, in the PDN. The PCRF 108 may provide the IP address range or the PDN ID, and the PCRF 108 may let the SCS choose the devices for which it can assist in reducing UL traffic. In an example embodiment of a specific devices case, the PGW 105 forms a list of devices and provides it to the PCRF 108, and in turn to the SCS 104. This list of devices may include devices that are performing high UL data that is causing congestion. The list of devices may include devices that are heavily affected by congestion (e.g., devices for which large number of UL packets are dropped). The SCS 104 may take an appropriate action, such as, for example, modifying the AF session or informing the UEs/devices over the user plane to reduce the traffic or delay the traffic.

Referring in particular to FIG. 4, in accordance with the illustrated embodiment, at 402, the PGW sends a LIR (Load Indication message) to the PCRF 108 when it detects that the data rate that it receives is high. Such a data rate may be causing a congestion that may result in packets being dropped, which may be referred to generally as an overload condition. This overload condition may result in effects at the APN level or at the PGW level. The message at 402 may indicate various information, such as, for example and without limitation: a cause, a direction, an affected entity, an affected APN, one or more affected UEs.

The cause may indicate a condition that caused the overload condition. For example, the PGW 105 may indicate a general data rate congestion or specific congestion that affects one or more UEs or is caused by a set of UEs. Thus, a cause value in the LIR message may be set to 'General Data Rate Congestion' or 'Specific Data Rate Congestion'.

In an example, the 'General Rate Congestion' cause value is used when there is general data rate based congestion on an APN or PGW. The following IEs may be included with a 'General Data Rate Congestion' cause, presented by way of example and without limitation: direction, affected entity, and an affected APN. The direction IE may indicate if the congestion is experienced in the downlink direction, the uplink direction, or both. The affected entity IE may indicate if the APN is affected or if the entire PGW 105 is affected by the overload condition. The affected APN IE may indicate a value associated with the affected APN. For example, a list of APNs may be provided if the entire PGW 105 is affected by the overload condition. Values associated with the affected APN may include, without limitation, an IP address range, a back-off timer DL, a back-off timer UL, a DL throttle value, and an UL throttle value. For each affected APN, an IP address range may be provided. In some cases in which the entire APN is affected by the overload condition, the IP range is omitted. The back-off timer DL value may indicate the duration for which the DL rate may need to be throttled. Such a value may be provided per affected APN. The back-off timer UL value may indicate the duration for which the UL rate may need to be throttled. Such a value may be provided per affected APN. The DL rate throttle value may be an absolute value or a percentage that indicates the amount of DL rate that needs to be reduced. Such a value may be provided per affected APN. The UL rate throttle value may be an absolute value or a percentage that indicates the amount of UL rate that needs to be reduced. Such a value may be provided per affected APN.

As mentioned above, the 'Specific Data Rate' cause value may be included in the message at 402 when some packets are dropped for specific UEs due to high UL or DL data rates. The following IEs may be included for 'Specific DL Rate' cause, present by way of example and without limitation: affected UEs, a UE identifier, a direction, a packet drop rate, an APN, a congestion source IP address, a congestion destination IP address, a back-off timer, a DL throttle rate, and an UL throttle rate. The affected UEs value include an indication, provided by the PGW 105, of the devices for which a number, for example a number above a predetermined threshold, of packets are being dropped. By way of example, the UE identifier may be the IMSI or the IP address allocated to the UE (e.g. in case of multiple active PDN connections). The direction IE may indicate if the congestion condition is being experienced in the downlink direction or the uplink direction. In some cases, if there is congestion on both directions, for example, then the UE is included twice in the 'Affected UEs' list. The packet drop rate IE may indicate a percentage or the absolute value of the number of packets that are dropped for a given device. The APN IE may identify the APN on which the packet drop is being observed. If the UE has multiple PDN connections, for example, this IE may help in identifying and reducing the data rate only on the affected APN. In some cases, the congestion source IP addresses is applicable for DL congestion. The PGW 105 may identify the source that is sending the high data rate which results in the packet drop. The PGW 105 may include multiple IP addresses, for example, in a case where the UE is connected to multiple SCSs. A drop percentage value may also be included for each IP address. Providing this IP address may help the PCRF 108 in determining the entity that needs to be contacted for DL rate reduction. In some cases, the congestion destination IP addresses IE is applicable for UL congestion. For example, the PGW 105 may identify the destination to which a given UE is sending high UL data, which is resulting in an overload or congestion condition. The PGW 105 may include multiple IP addresses (in the case where the UE is connected to multiple SCSs). A drop percentage value may also be included for each IP address. Providing this IP address may help the PCRF 108 in determining the SCSs that needs to be contacted for UL rate reduction. The back off timer IE may be included per congestion source or destination IP address. The DL rate throttle value may be included per congestion source IP address. The UL rate throttle value may be included per congestion destination IP address.

Still referring to FIG. 4, based on the message received at 402, the PCRF 108 may determine which AF/SCS, for instance the AF/SCS 104, needs to be contacted. The PCRF may use the 'Cause' type (General or Specific) to identify the SCSs that need to be contacted. The PCRF 108 may be configured with the list of SCSs in an APN or it may retrieve the details from the SPR/UDR 116.

At 404, in accordance with the illustrated embodiment, the PCRF 108 sends an 'AF/SCS Information and Profile Request' (APR) message to the SPR/UDR 116 to retrieve the list of SCSs that are available in an APN. The APR message may contain the 'Affected APN' IE. The SPR/UDR 116 may check the SCS subscription information and determine which SCSs have subscribed to the indicated APN. The SCS subscription information is further described below. The SPR/UDR 116 can also maintain a separate list of SCSs per APN instead of checking the subscription information associated with each SCS. In an example 'Specific Data Rate Congestion' case, the PCRF 108 may include the identifiers of the affected devices and the APNs on which they are affected.

At 406, in accordance with the illustrated embodiment, the SPR/UDR 116 sends a AF/SCS Information and Profile Answer (APA) response message containing the list of SCSs and the related subscription information for each of the SCSs. The subscription information for each of the SCSs may contain the permissions and capabilities of each of the SCSs, such as whether the SCS has the capability to support load reduction on an APN basis for example. In an example 'Specific Data Rate Congestion' case, the SPR/UDR 116 may provide the list of SCSs to which the UE has subscribed and that belong to the APN that was provided in the APR message at 404. This can be corroborated from the subscription information further described below. In some cases, the SPR/UDR 116 may provide the FQDN of the SCSs. For example, the PCRF may perform a DNS query on the SCS FQDN to determine the IP address(es) of the SCSs. The PCRF 108 may match these IP addresses with the 'Congestion Source IP Addresses' and the 'Congestion Destination IP Addresses' received from the PGW 105 to determine whether the congestion was caused by the traffic from a given SCS or the traffic towards the SCS, and to determine whether the SCS can be contacted to inform it about the UE's congestion state.

At 408, in accordance with the illustrated embodiment, the PCRF 108 sends the load indication message to each of the SCSs that has been chosen from the list received in the APA message (at 406) from the SPR/UDR 116. This message may contain various information, such as the cause, for example. The cause may be specific or general, as described above. In an example general cause scenario, the message at 408 may indicate APN/PDN information, such as, for example, the affected APN name, PDN, or the IP domain ID that the AF/SCS 104 can understand. In some cases, for example if only a part of the PDN is affected, the PCRF 108 may indicate the affected IP address range associated with each PDN. The SCS 104 may choose devices that fall into this range for load reduction. The message at 408 may also indicate the direction, the back-off timer DL, the back-off timer UL, the UL throttle value, and/or the DL throttle value, which are described above with reference to 402. In an example specific cause scenario, the message at 408 may indicate one or more affected UEs. For example, the message at 408 may include an external ID of the UE 103 or the IP address of the UE 103. Further, the message at 408 may include various IEs that are described above with reference to 402, such as, for example, the direction, packet drop rate, back-off timer DL, back-off timer UL, DL throttle value, and DL Throttle value.

With continuing reference to FIG. 4, after receiving the message at 408, the SCS 104 may perform different actions to reduce the congestion. The actions may be based on the direction of the congestion and an entity affected by the congestion. The SCS 104 may, for example and without limitation, modify/terminate AF Sessions to reduce the user plane data rate, command one or more UEs via the user plane (unicast or broadcast) to reduce their respective data communication or to schedule their data transfer for a later time (e.g., the SCS 104 may provide the back-off time), reduce the DL rate on the APN or towards specific UEs, or use the load indication to delay/schedule its DL traffic.

At 410, in accordance with the illustrated embodiment, the SCS 104 may identify AF sessions for which data rate can be reduced. The SCS 104 may send an AAR message to modify some AF sessions that require a high guaranteed data rate. The PCRF 108 may modify the PCC rules accordingly. At 412, the PCRF may send an AAA message, for example, as described in 3GPP TS 29.213.

At 414, in accordance with the illustrated embodiment, the SCS 104 may also choose the user plane method and send an application layer message to command one or more UEs, for instance the UE 103, to disconnect some bearers, reduce its activity, or completely disconnect from a PDN and detach. In order to assist the UE 103, the SCS 104 may provide various information to the UE 103. For example, the UE 103 may be provided with an indication and a backoff time that will cause it to stop sending data until the backoff timer expires. The UE 103 may be provided with an indication and a backoff time that will cause it to detach its PDN connection until the backoff timer expires. The UE 103 may be provided with an indication and a maximum data rate that will cause the UE 103 to limit its uplink traffic so that its UL data rate does not exceed the rate that was provided by the SCS 104. The UE 103 may be provided with an indication that will cause the UE 103 to stop sending data over the user plane (its IP connection) and limit its uplink data transmission to small data packets that can be carried in SMS, RRC, or NAS messages. The UE 103 may be provided with an indication that will cause the UE 103 to stop sending data over certain RATs and limit its uplink data transmission to other RATs.

At 416, the AF/SCS 104 may acknowledge its handling of the ALR message by sending an APN/PGW Load Indication Answer (ALA) message to the PCRF 108. At 418, the PCRF 108 may send a Load Indication Answer (LIA) message to the PGW 105. The LIA message may indicate that the PCRF 108 has taken necessary steps to reduce the load, thereby reducing the congestion or overload condition, caused by the high data rate. Alternatively, as shown generally in FIG. 3, the PGW 105 may send the load indication to the MTC-IWF 102. In such an alternative scenario, the MTC-IWF 102 may contact the HSS/UDR/SPR 116 to get the SCS details (similar to step 404 and 4-6 above) or it can be configured with this information. The MTC-IWF 102 may send the load indication to the SCSs that are present in the affected APNs. A call flow that uses the MTC-IWF 102 is similar to the call flow illustrated in FIG. 4, but the PCRF 105 is replaced with the MTC-IWF 102.

A congestion stop indication can be provided by the PGW 105 to the PCRF 108 when it detects that the congestion has eased and it can support more data. If, one or more, for instance all, of the SCSs receive the congestion stop indication at the same time then the one or more, for instance all, SCSs may try to resume their respective data transfers, which may again congest the network. Thus, the PCRF 108 may systematically send the congestion stop indications to the SCSs rather than sending it to all the SCSs at once. In some cases, the PCRF 108 may choose to inform some SCSs, wait for some time, and then check the load status with the PGW 105 before informing other SCSs. The CN may also provide the SCS 104 with how much additional data rate it can support. The SCS 104 may update the UEs with this information.

Turning now to overload control initiated by the PCRF, as described above, the PCRF may be able to detect overload conditions based on information that is gathered from the PGW. However, the PCRF may also determine that there is congestion based on input from other sources such as, for example, TDF, BBERF, SPR, DHCP servers, AF, etc. For example, when an APN is served by multiple PGWs and a single DHCP server, an individual PGW may not be aware of some resource exhaustion, such as IP addresses running out that are allocated to the UEs for example. In such scenarios, the PCRF can learn this overload condition and inform the PGWs and the AF/SCSs about the overload condition, thereby preventing a congestion state. The PCRF can also keep track of the rate of AF session creation/modification and throttle this rate to avoid an APN/PGW overload. Thus, in accordance with an example embodiment, the PCRF identifies overload conditions and indicates the conditions to the AF/SCS without explicit notifications from the PGW. Referring to FIGS. 2 and 3, in accordance with an example embodiment, step 202 that includes the LIR message can be omitted, and the LIA message can be omitted. The PCRF 108 can follow the other illustrated steps to perform overload control coordination with the AF/SCS 104.

Figure 5:
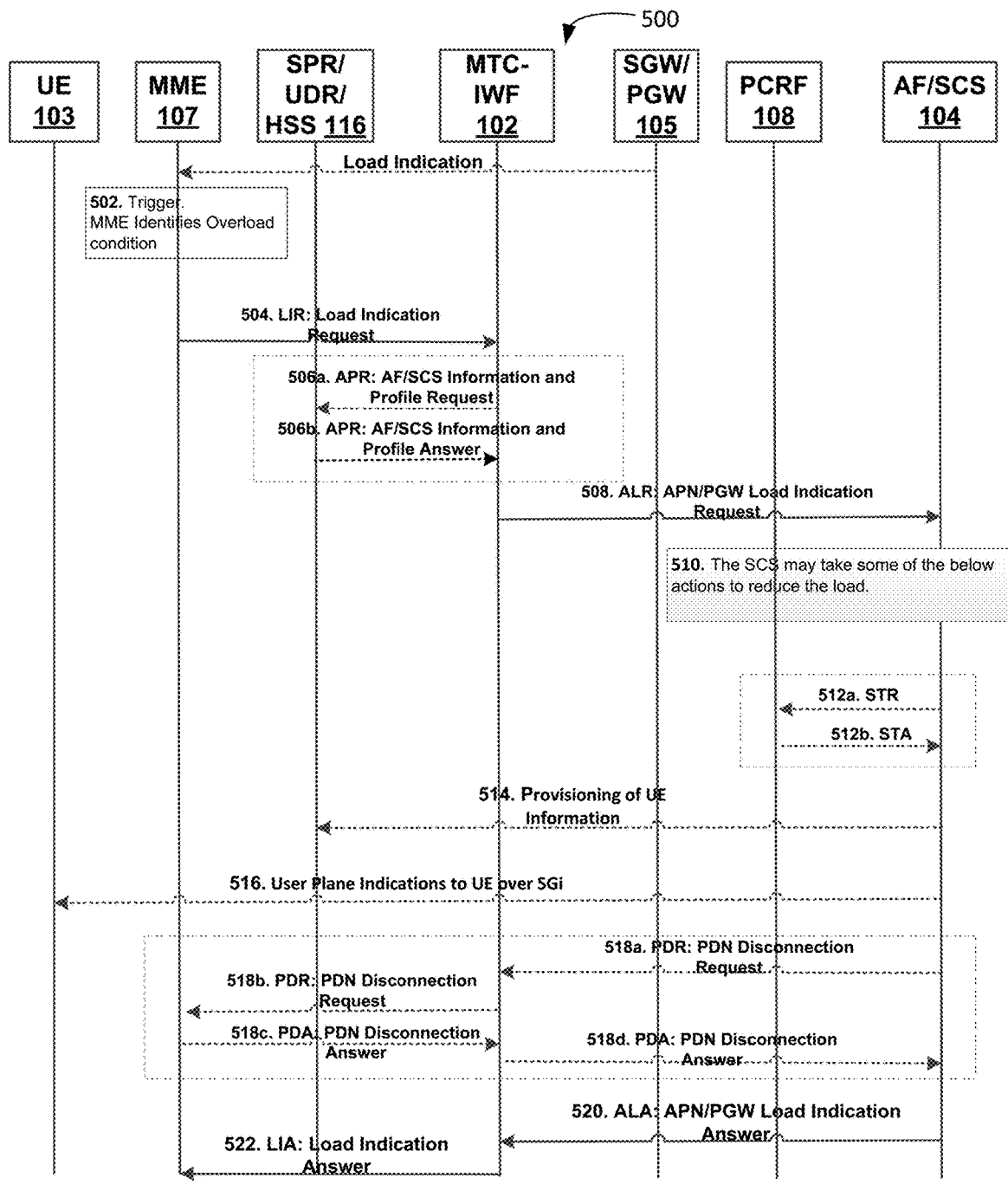
FIG. 5 is a flow diagram that shows an example of mobile management entity (MME) overload control coordination with the SCS in accordance with an example embodiment.

Referring now generally to FIG. 5, in accordance with an example embodiment, if a MME 107 gets into an overload state or has detected an overload condition in the network, it may coordinate with the SCS 104 to efficiently manage the overload condition. For example, overload situation detection at the MME 107 may be based on signaling congestion experienced by the MME 107 or over usage detection indicated to the MME 107 or monitored by the MME 107. Overload situations experienced by the MME 107 may be due to various reasons, such as the following, presented by way of example and without limitation: a high number of DDN messages from SGW(s), a high number of control plane signaling procedures for mobility management and/or session management of UEs, MME internal failures, operator settings, etc.

In accordance with an example embodiment, the MME 107 may also detect an overload situation in the network based on control plane indications or control plane monitoring. For example, the MME may detect NAS signaling congestion associated with an APN (e.g., see 3GPP TS 23.401) based on criteria such as, for example and without limitation, a maximum number of active EPS bearers per APN, a maximum rate of EPS Bearer activations per APN, one or more PDN GWs of an APN that are not reachable or that indicated congestion to the MME 107; a maximum rate of MME signaling requests associated with the devices with a particular subscribed APN; and/or a setting in network management. As mentioned in 3GPP TS 23.401, the MME 107 may be informed of a load or an overload condition associated with a node (e.g., SGW/PGW 105) using GTP control plane signaling. In another example, the MME 107 may indicate an overload state to the SCS 104. If the MME 107 detects an overload condition on an APN/PGW, for example, the MME 107 can send the indication to the MTC-IWF 102 and provide the APN name that is overloaded, and the criteria that is causing the overload. The MTC-IWF 102 can retrieve the list of SCSs that are present on the APN from the HSS 116 (SCS subscription database) and then send the overload indication to SCSs, for instance all the SCSs. The MTC-IWF 102 may translate the APN to a PDN ID or an IP domain ID that the SCS can understand.

It is also described herein that the CN or a UE may inform the SCS of the APN information/PDN information IP domain ID information through which an UE/M2M device can reach the SCS. Thus, the SCS can be informed of APN/PDN information on which the UE connects so that the SCS can control the UE activities on a specified APN. For example, the CN may pre-configure the SCS with this information, the SCS can dynamically determine the APN/PDN Information when the UE/M2M device connects/registers via a PDN, or the SCS may obtain this information from the UDR/HSS via the Mh interface. When the SCS receives the overload indication from the MTC-IWF, the SCS can take some action based on the criteria that is indicated in the message. For example, the SCS may, without limitation, reduce its downlink data rate towards the PDN, instruct the UEs/devices to reduce their traffic (UL) towards the SCS on a particular IP path, instruct the UEs to deactivate bearers (default or dedicated) and possibly provide a back off timer that can be used by the UE to determine when it may attempt to re-establish bearers, instruct the UEs to detach and possibly provide a back off timer that can be used by the UE to determine when it may attempt to re-establish bearers, provide a list of UEs to the CN (via the MTC-IWF) with a priority list that can be detached or deactivated (a maximum tolerable time may also be provided for each UE or it may be pre-determined as per the priority value), or configure the device information, such as priority and schedule, in the HSS/UDR over the Mh interface so that the CN can make use of that information to manage the overload condition.

Referring in particular to FIG. 5, an example network 500 includes a UE 103, a SGW/PGW 105, an SPR/UDR/HSS 116, a MTC-IWF 102, a PCRF 108, and an AF/SCS 104. It will be understood that the AF/SCS 104 may also be referred to as an M2M service layer, a network node, an application server, an application function, or a SCS without limitation. Similarly, it will be understood that the UE 103 may include an M2M device or any other MTC device as desired. Thus, it will be appreciated that the example network 500 is simplified to facilitate description of the disclosed subject matter and is not intended to limit the scope of this disclosure. Other devices, systems, and configurations may be used to implement the embodiments disclosed herein in addition to, or instead of, a network such as the network 500, and all such embodiments are contemplated as within the scope of the present disclosure. It will further be appreciated that reference numbers may be repeated in various figures to indicate the same or similar features in the figures.

At 502, in accordance with the illustrated example, the MME 107 identifies an overload condition. The MME 107 may identify different overload conditions by itself or with the help of inputs from other nodes, such as the SGW/PGW 105 for example. For example, the PGW 105 can inform the MME 107 of certain APN level load indications and GTP Control path load indications (e.g., per 3GPP TS 23.401). This also can be enhanced to let the PGW 105 inform the MME 107 about UL and DL data rate based congestion. By way of another example, the SGW 105 may provide 'Downlink Data Notifications' when the DL data is received for a UE in idle state. In some cases, the MME 107 can detect an overload condition based on the number of DDN messages received. A mechanism for DDN message throttling has been described in 3GPP TS 23.401. It is described herein that, under DDN based congestion, the MME 107 may notify the SCS 104 via the MTC-IWF 104, such that the SCS 104 can reduce its downlink data, reduces its device triggering rate, or schedule the device triggering for a later time. The MME 107 may maintain the number of PDN connections towards an APN and other parameters and use this information to determine an APN based congestion.

At 504, in accordance with the illustrated embodiment, the MME 107 sends a Load Indication Request (LIR) message to the MTC-IWF 102 when the MME 107 detects the overload condition as described above (at 502). The MME 107 an indication of the cause of the condition in the message at 504. For example, the cause may be 'DDN Based' or 'APN Based.' The message may indicate that the cause is DDN based when the overload condition was caused by a high volume of DDN messages. In such a scenario, the message at 504 may also include the Back-Off Timer IE, the affected APN IE, the affected UEs IE, or the like. In some cases, the number of affected UEs may be too large, and thus the affected UEs may be omitted from the message. The message at 504 may indicate that the cause was APN Based, for example, if the congestion was related to an APN. The MME 107 may also include the example IEs associated with the APN, as described above in the message at 504.

At 506a and 506b, in accordance with the illustrated embodiment, the MTC-IWF 102 may retrieve the SCS information from the HSS/SPR/UDR 116. This retrieval may be similar to how the subscription information is retrieved above. At 508, the MTC-IWF 102 sends an ALR message to one or more SCS, for instance the AF/SCS 104. If the congestion is DDN based, for example, then the MTC-IWF 102 may indicate a back off timer for DDN, affected PDN information, and affected devices. At 510, in accordance with the illustrated example, the SCS 104 decides on the procedures that it may employ, based on the type of congestion reported by the MTC-IWF 102. In 'DDN Based' overload scenarios, for example, the SCS 104 may reduce its downlink data rate, reduce the rate of device triggering, choose a different device triggering method, or delay device triggering. If a list of affected devices is provided to the SCS 104, the SCS 104 may schedule their activity for a later time in accordance with an example embodiment. At 512a and 512b, the SCS 104 may perform AF Session modification or termination to reduce the congestion levels. This step may not be applicable for a 'DDN Based' Overload condition. At 514, the SCS 104 may provision the HSS/UDR 116 with priority information associated with the devices (e.g., UE 103) that can be utilized by CN nodes to determine which UEs can be disconnected/detached or throttled. At 514, the SCS 104 can provision low access priority (LAP) information and emergency information associated with UEs as described in detail below. At 516, the SCS 104 may command the UEs, for instance the UE 103, over the user plane to disconnect from the PDN or to reduce their respective data rates as described above. Step 516 might not be applicable for a 'DDN Based' overload condition. At 518a, in accordance with the illustrated embodiment, the SCS 104 provides the MTC-IWF 102 with the list of UEs for which PDN connections can be deactivated. At 518b, the MTC-IWF 102 provides the disconnection request to the MME 107. At 518c, the MME 107 sends a disconnection answer to the MTC-IWF 102, which sends the answer to the SCS 104, at 518d. Steps 518a-d are not applicable for 'DDN Based' Overload in an example embodiment. At 520, as description above, the SCS 104 may indicate the action that it performed for 'DDN based' overload control. At 522, the MTC-IWF 102 may provide the MME 107 the action performed for 'DDN based' overload control. For example, if the action was that a different trigger mechanism was chosen, the MME 107 may ignore it. If the action was to delay device triggering, for example, the MME 107 may mark the SCS 104 so that the SCS 104 is notified when the DDN based congestion is sufficiently reduced.

The MME 107 may perform the above-described overload control coordination with the SCS 104 when the congestion/overload condition is near a critical limit. However, in one embodiment, if the congestion/overload state crosses a critical level beyond which the stability of the core network is threatened, the CN may automatically employ overload control mechanisms, such as those defined in TS 23.401, and thus detach/deactivate UEs based on their 'low access priority' indications without consulting or informing the SCS 104.

In accordance with various embodiments, the SCS may provision congestion related device information, such as LAP information for example. As described above, the existing overload control mechanisms in 3GPP make use of the 'low access priority' indications from an M2M device when it performs a NAS procedure or establishes an RRC connection. The core network considers the device as 'low access priority' for the lifetime of the connection and the CN can choose to terminate the connection during an overload/congested condition. The existing mechanisms depend on the UE indication of a 'low access priority' service. However, it is recognized herein that in many scenarios the SCS may be in a better position to determine the importance of the communication with a given device than the device itself.

For example, some communication with a given M2M device may be critical under certain circumstances. Such circumstances may depend on conditions such as, for example, time of day, date, location, operating conditions, provisioned configuration, an M2M subscription change, an indication from an application, or a status of other devices. For example, when an application on a M2M device is upgraded or a new application is installed on an M2M device, the SCS may want to update the LAP information of the device as per the communication requirement of the updated/new application, as long as the new application (e.g., an alarm application) is installed on the device.

In various embodiments described herein, the SCS has the ability to provision the 'low access priority' information to the core network. The core network can make use of this information and make more intelligent decisions during an overload state. In another example embodiment, the core network has this LAP information as part of the UE subscription information in the HSS/UDR. SCSs can be given the permissions to modify this information as per the subscription field 'Permitted for LAP Modification' that is described below.

The following is example LAP information that can be modified/provisioned by the SCS in accordance with an example embodiment, presented by way of example and without limitation: a Low Access Priority (LAP) Flag, a Low Access Priority Value, and a Low Access Priority Override Flag. In an example, the SCS can set the LAP flag anytime to indicate that a given device needs to be currently treated as a LAP device. The LAP value may provide a relative priority value for LAP devices. The LAP override flag may indicate whether the UE provided LAP flag or the LAP flag provisioned in the network needs to be considered.

By way of example, certain M2M devices, such as, for example, vital health parameter monitors, industrial and home safety and automation control devices, or the like, may perform critical activity. The communication from these devices may need to be considered (classified) as an emergency type. Further, some of these devices may be configured to or have the intelligence to perform emergency type attachment to the core network. In certain cases, for example, the communication with a device may not be critical at all times, but only under specific circumstances. By way of further example, it is recognized herein that these critical circumstances may not always be detected by the end devices, and sometimes only the SCS can have the logic to determine if the communication with a device should be classified as critical.

In accordance with an example embodiment, the SCS has the capability to provision the core network with emergency information so that the core network can classify communications from some devices as of an emergency type even if the device has not indicated that the communications should be classified as an emergency type. For example, one or more SCSs can be given the permissions to provision the emergency information associated with UEs in the HSS/UDR as per the subscription field 'Permitted for Emergency Modification'. The emergency information may include, for example and without limitation, an emergency device flag and an emergency device override flag. For example, the SCS can set the emergency device flag anytime to indicate that, from the time that is set, connections from the device are to be considered (classified) as emergency type. The emergency device override flag may indicate whether the SCS or the UE can override the indication provided by another node.

In existing 3GPP overload control procedures, the CN may disconnect or prevent devices that are marked as LAP. Thus, the provisioning of emergency type MTC devices can ensure that certain devices shall not be disconnected or prevented from accessing the network even when the CN is in an overloaded state or condition.

In accordance with an example embodiment, the SCS may provision the LAP and Emergency information for a UE at any point in time. In some cases, provisioning may be performed when the UE is not attached to the core network. The core network may check the permissions for the SCS before accepting the provision changes from the SCS. The SCS can perform the modification over the Mh interface or via the MTC-IWF over the Tsp interface. The SCS may perform this provisioning in response to a load indication from the CN as described above. A service within the SCS may initiate the procedure to perform this provisioning by making an API request, which may be translated by an SCEF to a request to the HSS/UDR on the Mh interface or to a request to the MTC-IWF over the Tsp interface.

Figure 6:
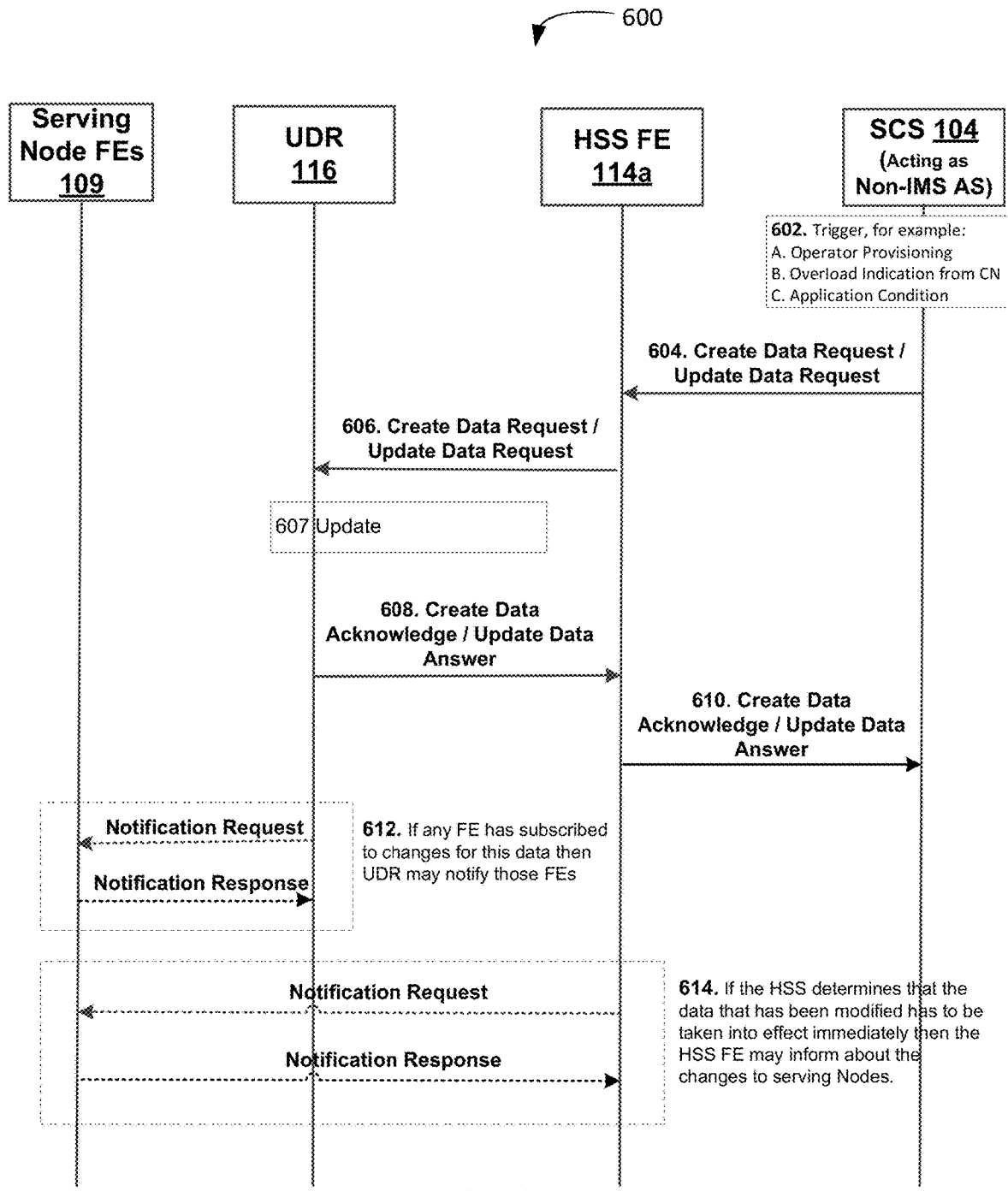
FIG. 6 is a flow diagram that shows a call flow for low access priority (LAP) and emergency information provisioning over an Mh interface in accordance with an example embodiment.

Referring now to FIG. 6, an example network 600 includes one or more serving node front ends (FEs) 109, a UDR 116, an HSS FE 114a, and an SCS 104 that acts as a Non-IMS AS. It will be appreciated that the example network 600 is simplified to facilitate description of the disclosed subject matter and is not intended to limit the scope of this disclosure. Other devices, systems, and configurations may be used to implement the embodiments disclosed herein in addition to, or instead of, a network such as the network 600, and all such embodiments are contemplated as within the scope of the present disclosure. It will further be appreciated that reference numbers may be repeated in various figures to indicate the same or similar features in the figures.

At 602, in accordance with the illustrated embodiment, the SCS 104 may detect the need (e.g., by receiving a trigger) to update UE information in the CN. The trigger may be due to an M2M operator changing the device characteristics/subscription information or due to an application condition. Alternatively, the trigger may be in response to an overload indication message received from the core network. Based on the trigger, at 604, the SCS 104 may send a create data request to the HSS FE 114a, for example, if the information associated with a given device is to be created for the first time. Alternatively, at 604, the SCS 104 may send an update data request to update subscription information associated with the given device. In accordance with the illustrated example, the message at 604 is sent over the Mh interface (e.g., see 3GPP TS 23.862). Example information that can be included in this message is described herein. The HSS FE 114a may validate the permissions for the SCS 104. In some cases, the HSS FE 114a may convert the information into a format that is maintained internally. For example, the SCS 104 may identify devices by their external identifier and the HSS FE 114a may convert the external identifier into an IMSI. At 606, the HSS FE 114a may send the create or update request to the UDR 116. At 607, the UDR 116 may update its records accordingly (e.g., see 3GPP TS 23.335). At 608, the UDR acknowledges the update to the HSS FE 114a (e.g., see 3GPP TS 23.335). At 610, the HSS FE 114a acknowledges the update to the SCS 104 (e.g., see 3GPP TS 23.862).

Figure 1C:
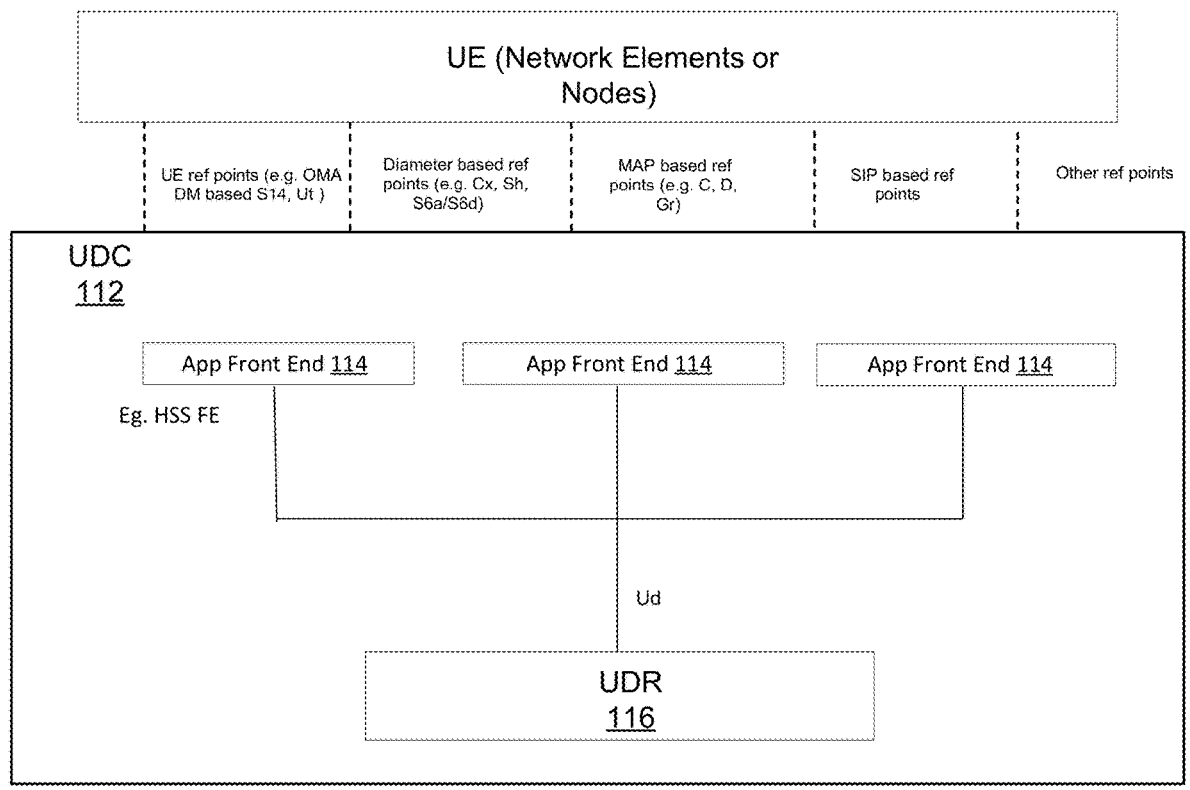
FIG. 1C is a system diagram that shows an example of a user data convergence (UDC) architecture.
Figure 1D:
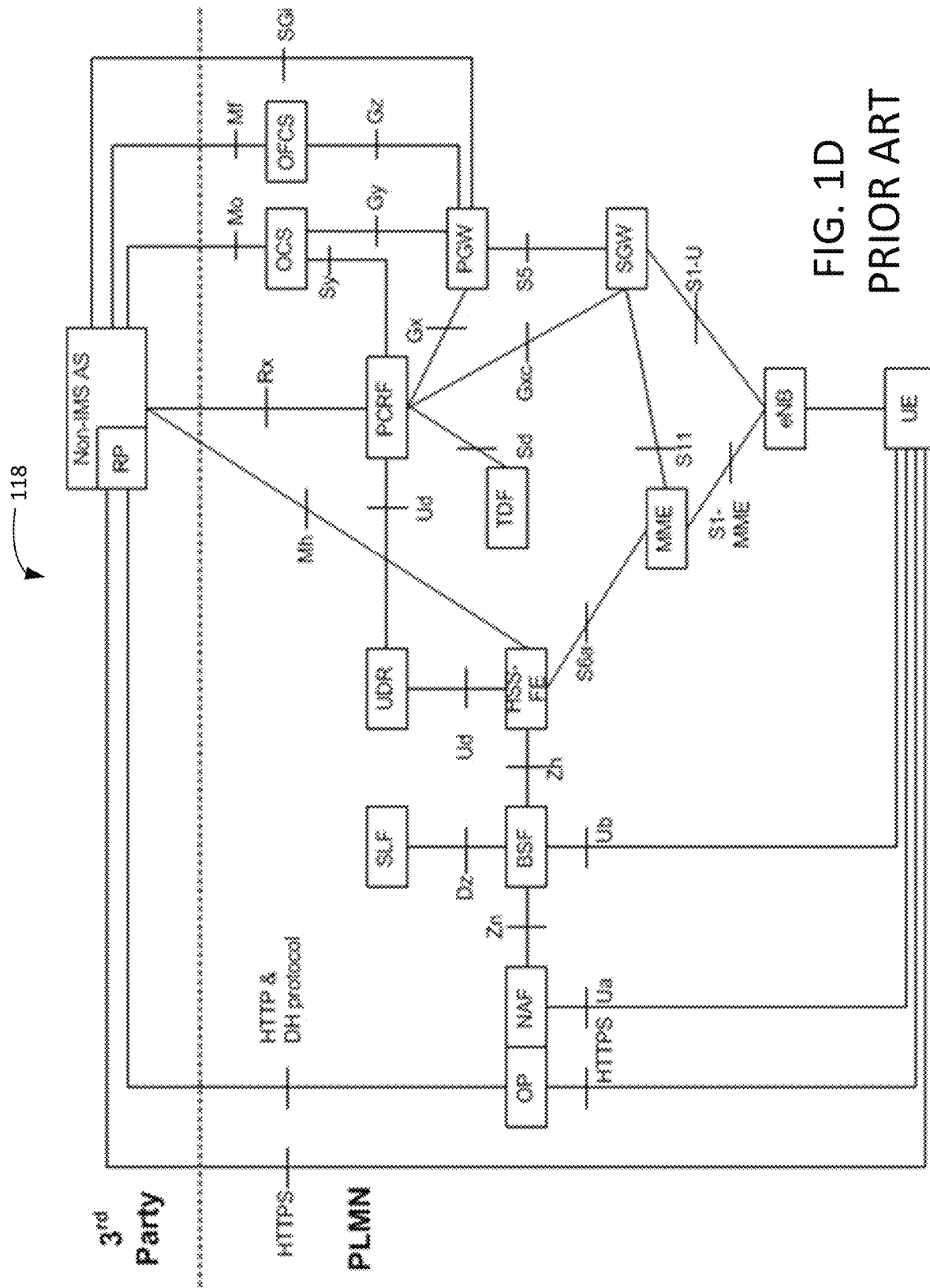
FIG. 1D is a system diagram that shows an example MOSAP non-roaming architecture.

Still referring to FIG. 6, at 612, in accordance with the illustrated embodiment, the UDC architecture (e.g., see UDC architecture 112 in FIG. 1C) enables FEs to subscribe to specific events associated with specific user data stored in the UDR 116, such that the FEs are notified of the events. For example, if any of the nodes/FEs 109 have subscribed to changes in a UE's MTC related information, the UDR 116 may notify those FEs 109 as further described in 3GPP TS 23.335. The serving nodes 109 can perform actions to apply the updated data. For example, a MME may subscribe to a UE's MTC specific data, and whenever the MTC information is updated in the UDR 116, the UDR 116 may send a notification to the MME. The notification may include an updated data value and/or other additional data that is based on a local configuration policy in the UDR 116. Examples of additional data include a previous value of updated data, the original subscribing entity identity, etc. The MME may then mark the UE as an emergency-type UE and perform other actions such as, for example, informing the eNB or the SGW/PGW.

Figure 7:
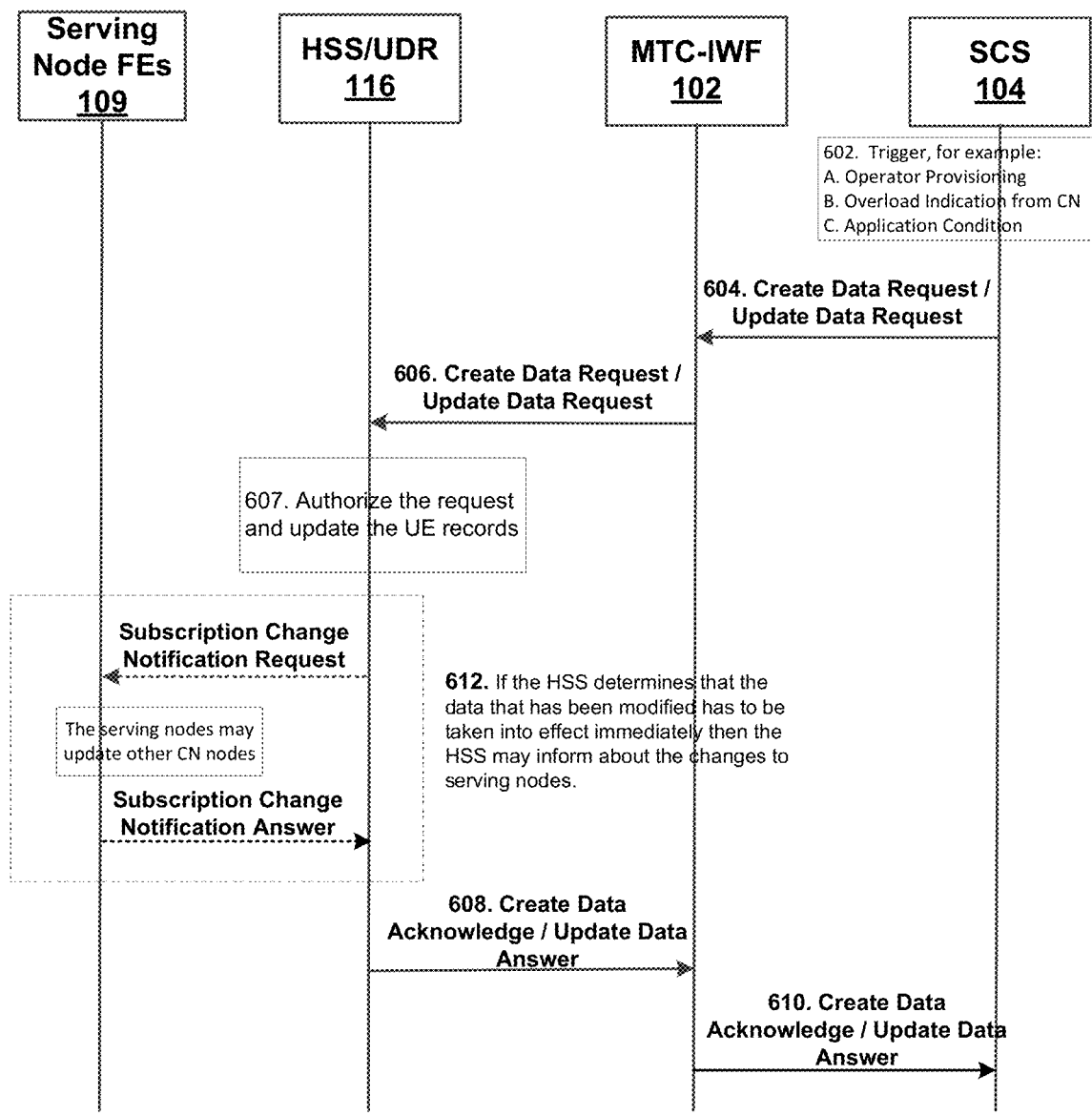
FIG. 7 is a flow diagram that shows a call flow for LAP and emergency information provisioning over a Tsp interface in accordance with an example embodiment.

At 614, the HSS 114a may determine that some nodes have to be informed about the changes so that the changes made to the UE's MTC information become effective. The HSS 114a may inform the serving nodes 109 and the serving nodes 109 may configure other nodes to make the changes effective. For example, if a device has been classified as emergency type, the HSS 114a may inform the MME so that the MME considers that device as emergency type. The MME may in turn configure other nodes such as, for example, the eNB and the PGW. Alternatively, the SCS 104 can also perform the provisioning of the MTC device information in the core network via the Tsp interface as shown in FIG. 7.

By way of example, an SCS can get into an overload/congested state similar to a network node that handles a large number of devices/connections. In addition to the congestion/overload control methods that an SCS may employ at the service layer level, an SCS may benefit from the underlying network layer providing assistance in managing the overload state of the service layer. Described below are some example ways in which the underlying core network can assist the service layer to manage its overload state in accordance with various embodiments.

It will be understood that an SCS may manage and control a large number of M2M devices. Many of these M2M devices may be expected to be idle for most of time. Thus, the number of devices that a SCS serves at any point in time may be much smaller than the total number of devices that may simultaneously communicate with the SCS. However, there may be some occasions where more devices require connectivity with an SCS, which may cause the SCS to get into an overload state. The SCS may reject connection attempts from low priority devices or disconnect some existing low priority devices to reduce its congestion levels. For example, a M2M device would have to attach to a network, activate a PDN connection, and perform some user plane messaging to reach the SCS before the SCS chooses to reject the devices. If these devices are rejected at the network layer (during attach) then it may provide benefits, such as those listed below, for example and without limitation, reducing message processing at service layer, conserving battery power on the device, reducing core network traffic, and reducing unnecessary billing/charging associated with devices.

It is described herein, in accordance with an example embodiment, that when an SCS is in an congested or overload condition, the SCS may send an indication of the condition to the core network, and the SCS may provide a list of devices that need to be prevented from accessing the SCS/service layer. The SCS may also provide a list of devices that needs to be immediately disconnected from the network. The SCS may also provide a back-off timer indicating the duration for which a device's SCS access has to be prevented. The SCS may also send a congestion control stop message to indicate that the SCS is no longer under congestion and to indicate that the core network need not perform any congestion control on behalf of the SCS.

Figure 8:
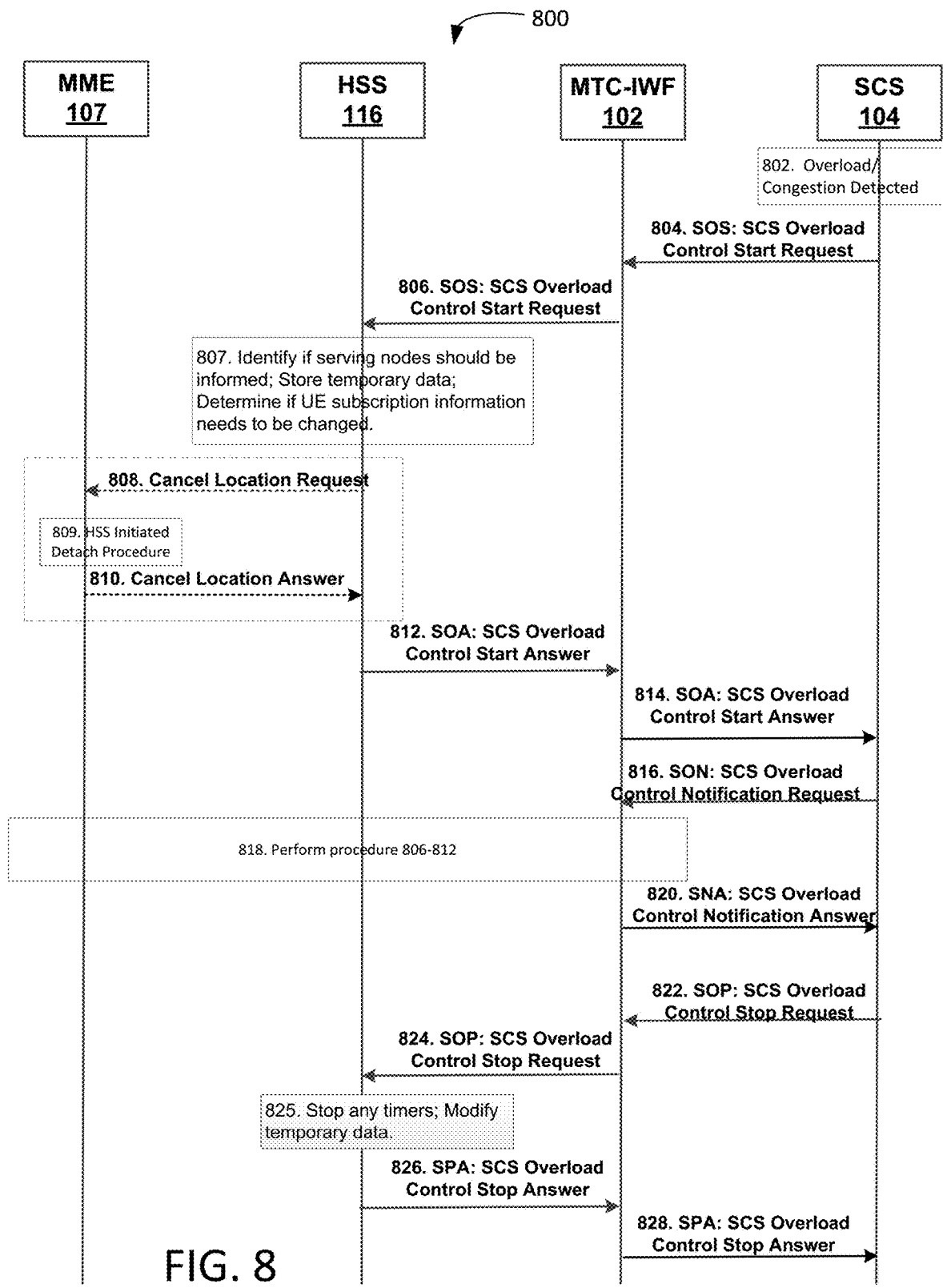
FIG. 8 is a flow diagram that shows an example of SCS overload control over the Tsp interface in accordance with an example embodiment.

The SCS can send start/stop overload control messages to the HSS/UDR over Mh or to the MTC-IWF via Tsp. The start message can contain the list of device that needs to be released and prevented from accessing the service layer until the stop message is received or until a certain period of time elapses. In between start and stop message, for example, the SCS may send one or more congestion notification/control messages to alter or provide additional information about devices that needs to be released. FIG. 8 shows an example call flow of this case over the Tsp interface.

Referring to FIG. 8, an example network 800 includes an MME 107, an HSS 116, a MTC-IWF 102, and an SCS 104. It will be appreciated that the example network 800 is simplified to facilitate description of the disclosed subject matter and is not intended to limit the scope of this disclosure. Other devices, systems, and configurations may be used to implement the embodiments disclosed herein in addition to, or instead of, a network such as the network 800, and all such embodiments are contemplated as within the scope of the present disclosure. It will further be appreciated that reference numbers may be repeated in various figures to indicate the same or similar features in the figures.

At 802, in accordance with the illustrated example, the SCS 104 may detect an overload condition, for example, based on the number of devices connected to it or based on operator provisioning. The SCS 104 may detect an overload/congestion situation in the service layer. The congestion may be due to different causes, such as, for example, a high number of connected M2M devices, a high volume of ongoing M2M procedures, faulty devices repeatedly trying to connect to the SCS 104, various system failures, or the like. To recover from the congestion, the SCS 104 may decide to temporarily stop new M2M connections. By way of further example, the SCS may disconnect some existing devices that are connected, or the SCS 104 may some devices from connecting to the SCS 104. In accordance with the illustrated embodiment, the SCS determines that it needs the assistance of the core network in managing its congestion state.

At 804, in accordance with the illustrated embodiment, the SCS sends an SCS Overload Control Start (SOS) message to the MTC-IWF 102, over the Tsp interface. This message may indicate various information, such as, for example and without limitation, a type, a disconnection list IE, a device ID, a disconnection type IE, an idle mode detach IE, a back-off timer IE, or a vulnerability list. The type IE may be set to 'Start' to indicate that this is the start of a congestion control. The Disconnection List may indicate a list of devices that need to be immediately disconnected from the network. The device ID may identify a device in the disconnection list. For each device, the Disconnection Type IE may indicate how the core network should handle the device. For example, the disconnection type may indicate whether the core network completely detach the device or whether the core network should deactivate the PDN connection of the device. For each device in the list, the idle mode detach IE may indicate if the core network should attempt to detach/deactivate the device even if the device is in idle mode. For each device, the back-off timer may indicate a time period during which the device should not perform any attach attempts. The vulnerability list IE may indicate a list of devices that can be automatically detached from the network to allow other emergency M2M devices to access the SCS 104. Example information that may be provided for the devices in the vulnerability list includes, without limitation, a device ID, a priority, back-off timer, and a vulnerability duration. In an example embodiment, the vulnerability duration is the time period during which the device is considered to be vulnerable.

Still referring to FIG. 8, in accordance with the illustrated embodiment, the MTC-IWF 102 may forward the SCS overload Control Start message to the HSS 116 (at 806), over the S6m interface. At 807, the HSS 116 may perform various actions. For example, the HSS 116 may check the permissions of the SCS 104 to perform the operation/request received at 806, map the external ID of the devices into local identifiers (e.g., IMSI), store the disconnection list and/or vulnerability list, determines which of the devices in the 'Disconnection list' are currently attached and prepare to send a notification to their corresponding serving nodes, and/or determine the APN associated with a given UE if a PDN disconnection was requested.

At 808, the HSS 116 may send a 'Cancel Location Request' message to the serving nodes (e.g., MME 107/SGSN) so that the serving nodes can detach the devices indicated in the message. The message at 808 may be a S6a diameter message. The message at 808 may indicate an IMSI, a cause type, an APN, a back-off timer, or a disconnection flag. The cause type may indicate whether the cause was an SCS Initiated Detach or an SCS Initiated PDN Disconnection. The APN may be sent for an SCS Initiated PDN Disconnection. The disconnection flag may indicate whether any UEs in idle mode should be considered. At 809, the MME 107 may perform actions similar to an HSS-initiated detach procedure or a network initiated PDN disconnection procedure, as indicated by the 'Disconnection Flag'.

At 810, in accordance with the illustrated embodiment, the MME 107, which can also be referred to as an MME/SGSN 107 without limitation, sends a 'Cancel Location Answer' after it has completed the requested actions. At 812, the HSS 116 sends a SCS Overload Control Start Answer (SOA) message to the MTC-IWF 102, which is sent over the Tsp interface. The message at 812 may contain a report on the number of devices that were disconnected. At 814, in accordance with the illustrated example, the MTC-IWF 102 forwards the SCS Overload Control Start Answer message to the SCS 104 over the S6m interface. At 816, the SCS 104 may decide that it needs to detach more devices to be relieved of the congestion condition. In this case, for example, the SCS 104 may send a SCS Overload Control Notification Request (SON) message to the MTC-IWF 102 over the Tsp. In this message, the SCS 104 may set the 'Type' of the message to 'Notification'. In some cases, this message may contain the same IEs as described with reference step 804 above. At 818, the core network may perform steps 806 to 812 to handle the SCS Overload Control Notification Request message from the SCS 104. At 820, the MTC-IWF 102 sends a SCS Overload Control Notification Answer (SOA) message to the SCS 104 over the S6m interface. At 822, when the SCS 104 determines that it is no longer in an overloaded state, for example, it may send a SCS Overload Control Stop Request (SOP) message over the Tsp interface. At 824, in accordance with the illustrated example, the MTC-IWF 102 may forward the SCS Overload Control Stop Request (SOP) message to the HSS 116 over the S6m interface. At 825, the HSS 116 may, for example, stop any timers running for the devices, or delete the disconnection and vulnerability list. At 826, the HSS 116 may acknowledge its processing of the overload stop request by sending an SCS Overload Control Stop Answer (SPA) message to MTC-IWF 102 over the S6m interface. At 828, the MTC-IWF 102 may forward the SCS Overload Control Stop Answer (SPA) message to the SCS 104 over the Tsp interface. Alternatively, the SCS 104 may indicate the overload control start, notification, and stop messages over the Mh interface to the UDR/HSS 116. The call flow and procedure for this case, for example, may be similar to FIG. 8 described above except that the MTC-IWF 102 is removed, and the SCS 104 directly sends the overload control message to the HSS 116. Further, the HSS sends 116 the replies directly to the SCS 104 over the Mh interface in accordance with the example alternative embodiment.

Turning now to provisioning SCS related congestion information in the CN, the SCS may perform preventive congestion control mechanisms by provisioning overload control parameters of the SCS in the core network, and by having the core network perform some overload control on behalf of the SCS. The SCS overload control parameters can be temporary subscriber data that is stored in the SCS subscription database. The CN can control the connections of M2M devices to the SCS and prevent certain overload scenarios by enforcing the parameters provided by the SCS. This is an example preventive action to avoid overload at the service layer. Other factors at the service layer may cause congestion where the assistance of CN may be required to reduce the congestion. In such scenarios the procedures described above can be used.

In some cases, there can be a group in the HSS that maintains the count of the number of devices that is connected with an SCS. For example, if this count exceeds a threshold value that is provided by the SCS, the HSS can prevent further connections towards that SCS. The HSS can also inform the SCS when the count reaches a level that is close to the threshold so that the SCS can increase the threshold (e.g., if the SCS has additional capacity).

The SCS can also provision the UE's LAP and emergency information as described in above so that the core network knows which devices to prevent from attaching (e.g., when the threshold is reached) and which devices to allow (e.g., emergency type devices) even though the threshold has been reached.

Figure 9:
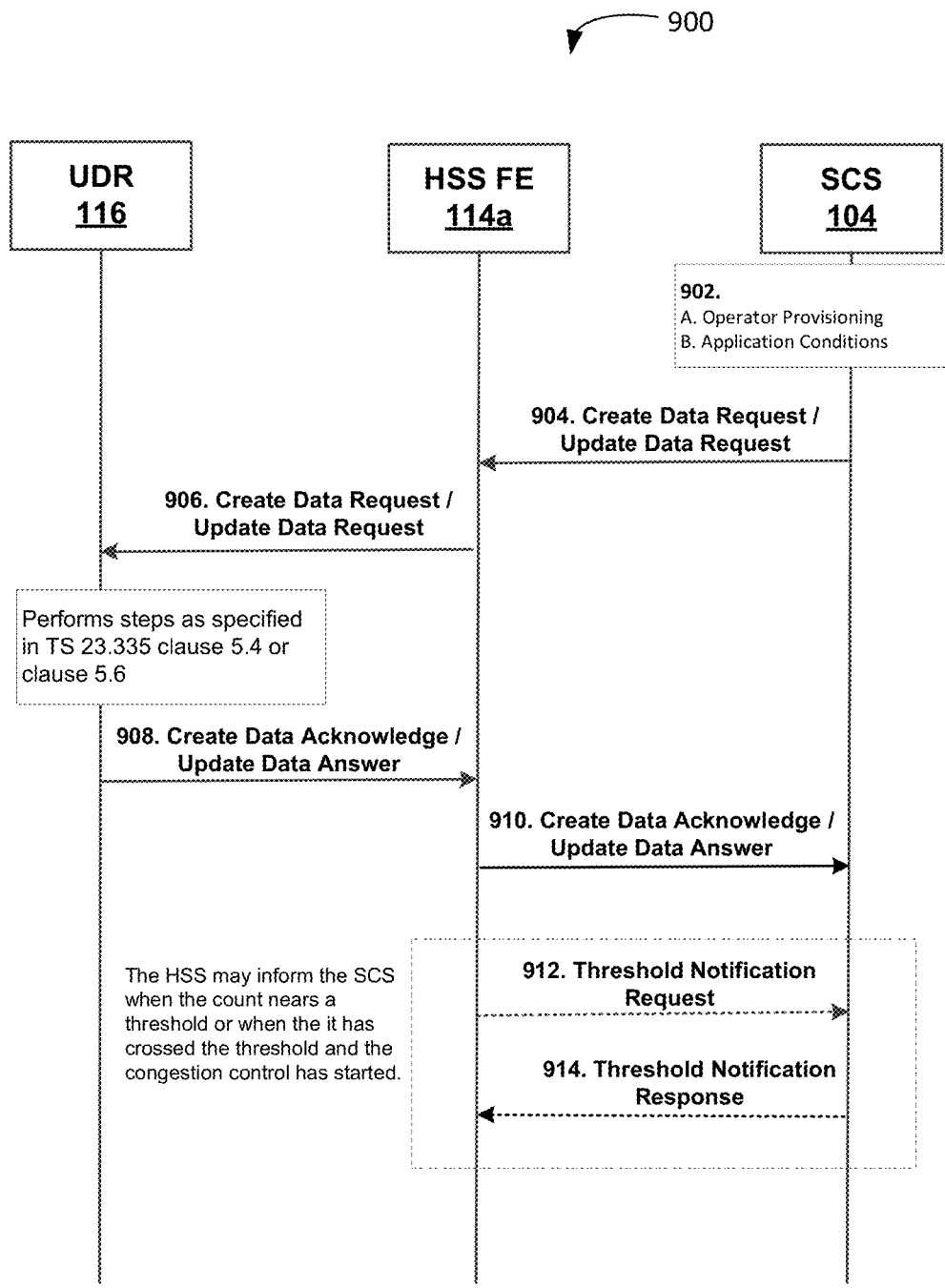
FIG. 9 is a flow diagram that shows an example call flow for provisioning SCS congestion parameters over the Mh interface in accordance with an example embodiment.

The SCS may provision a separate vulnerability parameter and a priority value to indicate the devices that need to be detached to allow new devices to attach, or the LAP information described above can indicate this information. FIG. 9 shows an example call flow for provisioning SCS congestion parameters over the Mh interface in accordance with an example embodiment.

Referring to FIG. 9, an example network 900 includes a UDR 116, an HSS FE 114a, and an SCS 104. It will be appreciated that the example network 900 is simplified to facilitate description of the disclosed subject matter and is not intended to limit the scope of this disclosure. Other devices, systems, and configurations may be used to implement the embodiments disclosed herein in addition to, or instead of, a network such as the network 900, and all such embodiments are contemplated as within the scope of the present disclosure. It will further be appreciated that reference numbers may be repeated in various figures to indicate the same or similar features in the figures.

At 902, in accordance with the illustrated example, the SCS 104 determines the need to provision the CN with overload control parameters associated with the SCS 104. The SCS 104 may also provision the CN with other information related to devices in communication with the SCS 104. The determination at 902 may be based on, for example, an M2M operator provisioning change or an application condition. At 904, the SCS 104 may send a Create Data request or Update Data request, for example, depending whether data is being created or existing data is being updated. The message at 904 may be sent over Mh interface to the HSS 114a as defined in 3GPP TS 23.862, for example. At 906, the message may be forwarded to the UDR 116. This message may indicate various information, such as, for example without limitation: a maximum number of attached devices threshold, which may indicate a maximum number of devices that have subscribed to the SCS 104 and that the CN can allow to attach; an action type, which may indicate whether the CN can automatically start congestion control on behalf of SCS 104 or if the CN should first inform the SCS 104 (as described, above, the SCS 104 can also provide a percentage value so that the CN informs the SCS 104 when the total number of attached devices reaches the percentage associated with the maximum number of attached devices threshold; LAP information, which can be provided for a list of UEs as described above; emergency information, which can be associated with respective UEs as described above; and vulnerability information, which can include a list of UEs with their respective vulnerability flag indicators and priority value. In an example embodiment, the LAP information is applied when the CN is under congestion, and the vulnerability information is applied when the SCS is under congestion.

At 906, in accordance with the illustrated embodiment, the HSS FE 114a may update the UDR 116 (e.g., see 3GPP TS 23.335). At 908, the UDR 116 may send an acknowledgement to the HSS FE 114a (e.g., see 3GPP TS 23.335). At 910, the HSS FE 914a sends an acknowledgement to the SCS 104 (e.g., considered as Non-IMS AS) (e.g., see 3GPP TS 23.862). At 912, when the count reaches the threshold value or reaches a percentage of the threshold value as indicated in the 'Action Type' IE, for example, the HSS 114a may inform the SCS 104 of this event. This may allow the SCS 104 to take appropriate actions. In some cases, the SCS 104 may have more room to allow some more UE to attach, and the SCS 104 may increase the threshold value. At 914, the SCS 104 acknowledges the notification by sending a 'Threshold Notification Response' message to the HSS 114a. Alternatively, the SCS 104 can perform the provisioning of the MTC device information in the core network via the Tsp interface.

Thus, referring generally to FIGS. 8 and 9, a core network node may include a processor, a memory, and communication circuitry. The core network node may be part of a core network via its communication circuitry, and the core network node may further include computer-executable instructions stored in the memory of the core network node which, when executed by the processor of the core network node, cause the core network node to receive a first request associated with a congestion condition of a service layer node. The request may include one or more parameters corresponding to the congestion condition. Based on the one or more parameters, the core network node may determine a first device to disconnect from the service layer node, and the core network node may detach the first device from the service layer node. The one or more parameters may include an idle mode parameter that instructs the core network node to detach the first device. As described above, the one or more parameters may include a disconnection list that indicates a plurality of devices that should be immediately disconnected from the core network upon receipt of the first request, and the disconnection list may include the first device. As also described above, the one or more parameters may include a vulnerability list that indicates a plurality of devices that can be detached from the core network to allow higher priority devices to access the service layer node, and the vulnerability list may include the first device. In one example, the one or more parameters may include a back off timer indicative of a time period after which the first device can attempt to reattach to the service layer node.

Described above various methods and systems for controlling congestion scenarios in accordance with various example embodiments. As described below, in accordance with an example embodiment, an SCS can retrieve a current load level of the core network and schedule/plan its communication with devices so that there is an increased probability that the communication is successful, and so that an overloaded or congested condition in the core network is avoided.

Procedures that can be performed by the SCS, such as, for example, bulk device triggering, data transfer to a large number of devices in an area, or the like, can potentially congest the core network and cause failure to some of these procedures. Thus, in accordance with an example embodiment, before the SCS attempts these kinds of procedures, the SCS checks with the core network to determine if the core network is loaded, and to determine whether the core network has the capacity to handle the procedure that the SCS wants to perform.

Figure 10:
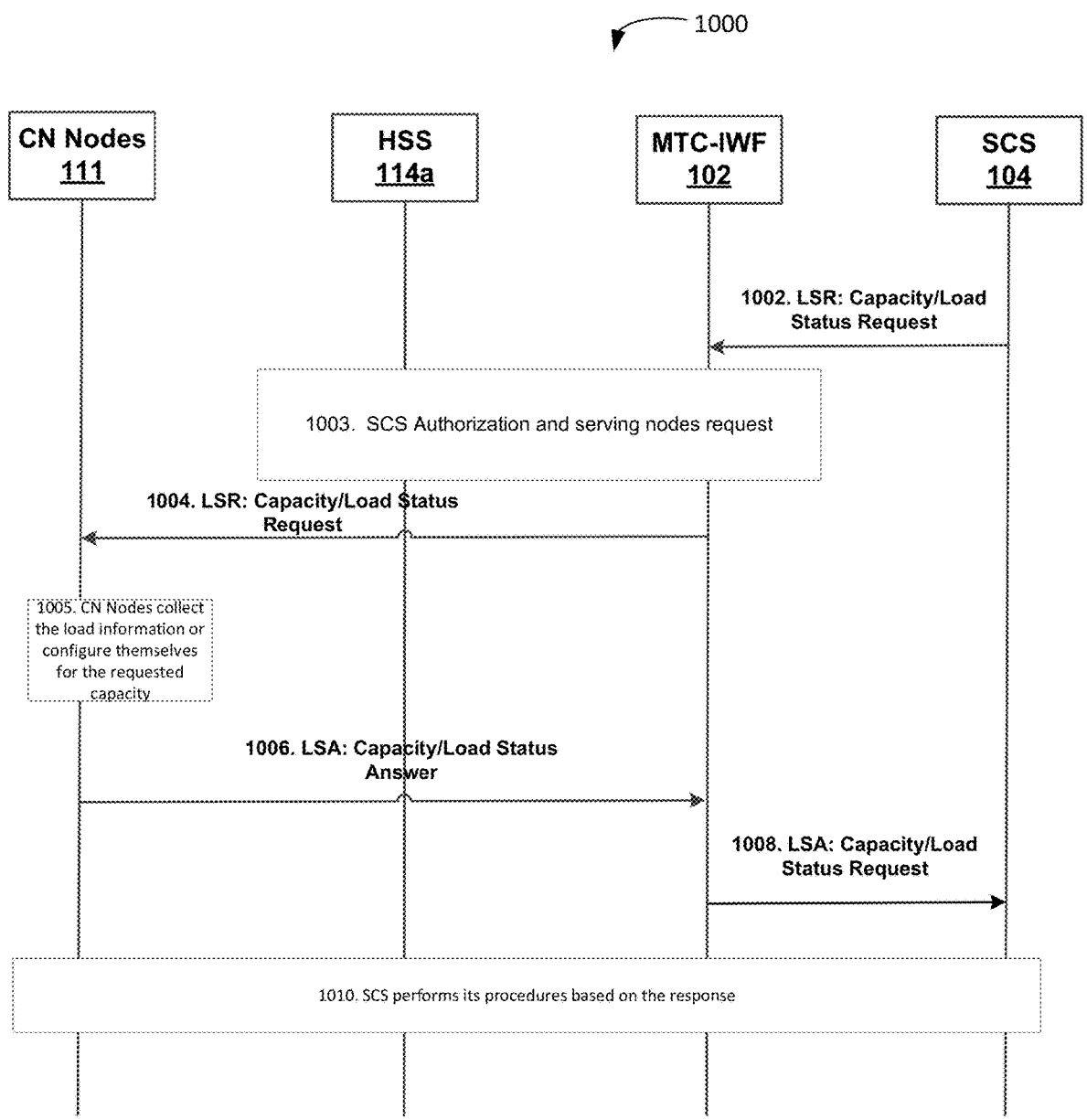
FIG. 10 is a flow diagram that shows an example call flow for requesting a core network (CN) capacity in accordance with an example embodiment.

By way of example, if the SCS has to trigger 10000 devices that will then connect to the SCS via an APN, and perform data transfer of approximately 50 GB in a span of 10 minutes, then the SCS can inform the core network about this procedure and the core network can find out if the PGW(s) that are handling the APN have enough resources to support this request. In response, the core network can inform the SCS of its ability to support the request or the level to which it can support. By way of further example, the core network can respond that it can support 25 GB for 10 minutes. Based on the response, the SCS can react accordingly, such as by triggering a certain number of devices (e.g., 5000). The core network can also reserve the requested resources and then inform the SCS of the reservation. FIG. 10 shows an example method in which an SCS 104 requests the capacity and load condition of the core network before attempting its service layer procedures, in accordance with an example embodiment.

Referring to FIG. 10, an example network 1000 includes a plurality of CN nodes 111, an HSS 114*a*, an MTC-IWF 102, and an SCS 104. It will be appreciated that the example network 1000 is simplified to facilitate description of the disclosed subject matter and is not intended to limit the scope of this disclosure. Other devices, systems, and configurations may be used to implement the embodiments disclosed herein in addition to, or instead of, a network such as the network 1000, and all such embodiments are contemplated as within the scope of the present disclosure. It will further be appreciated that reference numbers may be repeated in various figures to indicate the same or similar features in the figures.

At 1002, in accordance with the illustrated example, the SCS 104 sends a Capacity/Load status Request (LSR) message to the MTC-IWF 102 over the Tsp interface. The SCS 104 may send this message when it determines a need to perform a CN load intensive operation. For example, the SCS 104 can be configured with threshold information associated with the data rate, number of device triggers, or the like. Thus, when the SCS 104 sees that the procedure that it intends to perform would exceed these threshold values, for example, the SCS 104 may check with the core network regarding its capability to handle the SCS procedure. These thresholds values can be operator provisioned or provided by the CN. The message at 1002 may contain information about the procedure that the SCS intends to perform and some parameters related to the procedure. For example, the message may indicate if the core network needs to reserve any resources for supporting the SCS procedure, or if the core network just needs to respond with the acceptable limit associated with the procedure. In some cases, if the core network performs any resource reservation, then the SCS 104 may be charged separately for the resource reservation. The message at 1002 may indicate, for example and without limitation, a type of procedure and one or more device triggering parameters. The type of procedure IE may indicate the procedure that the SCS intends to perform. Each type of procedure may have different parameters associated therewith. It will be understood that the parameters mentioned below are not mandatory, but presented by way of example, and the SCS can send any relevant combination of these parameters. Example device triggering parameters include, without limitation: a number of devices, which may indicate a number of devices that are to be triggered; a trigger response type, which may indicate an expected response from the UEs for the trigger (e.g., this may indicate whether the UE would respond with a single short message or the UE would establish a data communication requiring multiple message transfers; the size of the response and the number of message exchanges required may also be included); an expected data rate, which may indicate an increase in the existing data rate that is expected when all the devices are triggered (e.g., this may also be provided per UE); an affected area, which may indicate an in which the UEs would be triggered (e.g., a specific geographic area, a tracking area, or global which may indicate that the SCS is not aware of the location of the device); an affected APNs/IP Domain ID, which may indicate Information concerning the APN or the IP Domain in which the responses are expected; and a delay tolerance, which may indicate the time during which the device triggering can be delayed. The CN may use the delay tolerance to determine a better time for triggering during a given time period, for example based on its estimated load conditions period in the time period. The message may also include Bulk Data Transfer Parameters, such as, for example and without limitation, a type of data transfer, which may indicate a unicast, multicast, broadcast data transfer; a number of devices, which may indicate a number of UEs for which the data transfer is to be performed (e.g., a list of UE identifiers may also be provided for unicast, and the affected area may be provided for broadcast/multicast); a quality of service (QoS), which may indicate the expected QoS for the data transfer (e.g., specifies the DL rate, UL rate, etc.); and a delay tolerance, which may indicate a time during which the data transfer may be delayed. The message at 1002 may also include a resource reservation IE, which may indicate that the SCS wants the CN to perform resource reservation for the procedure, or that the SCS wants the CN to respond with its current capabilities. At 1003, the MTC-IWF 102 may check with the HSS 114*a* regarding an authorization for the SCS 104 to perform the procedure, and may retrieve the serving nodes that needs to be contacted.

Still referring to FIG. 10, at 1004, in accordance with the illustrated embodiment, the MTC-IWF 1002 may send a Capacity/Load status Request (LSR) message to each of the serving nodes (e.g., CN nodes 111) returned by the HSS 114*a*. The MTC-IWF 102 may include information that is relevant for each of the nodes 111 and indicate if the nodes 111 need to reserve resources or provide their respective current capacities to handle the request. Depending on the request type, for example, the serving nodes 111 may configure themselves, at 1005. The nodes 111 may also configure other relevant nodes to which they are connected, or the nodes 111 may retrieve load and capacity information associated with other relevant nodes. At 1006, in accordance with the illustrated example, the nodes 111 send a Capacity/Load status Answer (LSA) message to the MTC-IWF 102 after performing the requested action. This message may contain an indication of whether or not each node 111 can support the requested operation. At 1008, the MTC-IWF 102 sends the Capacity/Load status Answer (LSA) message to the SCS 104 over the Tsp interface. For each type of procedure that the SCS 104 requested, for example, the MTC-IWF 102 may provide an acceptable level that can be handled by the CN and the time at which the SCS procedure may be performed. The message at 1008 may also indicate whether the resource reservation was successfully completed or not. At 1010, the SCS 104 may schedule its procedures as per the reply from the CN at 1008, for example. Alternatively or additionally, the CN nodes 111 can periodically provide their capabilities to the SCS 104 in an unsolicited manner. For example, the CN may provide the data rate that it can handle on certain APNs, or the load condition in a geographic area. In an alternative embodiment, the MTC-IWF 102 in FIG. 10 is replaced with a PCRF. Thus, the LSR and LSA commands between the PCRF and SCS are sent on the Rx interface in accordance with the alternative embodiment.

Thus, as described above, referring generally to FIG. 10, service layer node, for instance the SCS 104, may include a processor, a memory, and communication circuitry. The service layer node may be connected to a core network via its communication circuitry, and the service layer node may further include computer-executable instructions stored in the memory of the service layer node which, when executed by the processor of the service layer node, cause the service layer node to send a request that informs a node of the core network of an operation that the service layer node intends to perform. The operation may require resources of the core network. Based on the request, the service layer node may receive a message from the core network. For instance, the message may be received from the PCRF or the PGW. The message may indicate at least one of a time for the service layer node to perform the operation, a capability of the core network that can be used for the operation, or an indication that the required resources are reserved for the operation. The request may be sent when the service layer node determines that the operation requires a data rate that is greater than a predetermined threshold. Alternatively, the request may be sent when the service layer node determines that the operation triggers a number of devices that is greater than a predetermined threshold. As described above, the request may include an indication of at least one of, presented by way of example and without limitation: a type of a procedure that the service layer node intends to perform, a number of devices on which the service layer node intends to perform the procedure, a data rate that will be required for the procedure, a geographic area where devices on which the service layer intends to perform the procedure are located, an access point name (APN) that will be used for the procedure, a delay tolerance of the procedure, or one or more resources that should be reserved for the procedure.

In order to provide efficient congestion control mechanisms, the core network may need to know information about the devices and service layer parameters. In an example embodiment, some of this information can be permanently provisioned in the subscription information and some information can be modified as part of the system operation. As described herein, in accordance with various example embodiments, the following information that is presented by way of example and without limitation can be added to the UE's subscription information that is maintained at the HSS/UDR (see Table 1 below).

TABLE 1

| Field Name |
| --- |
| Low Access Priority |
| Low Access Priority Value |
| Low Access Priority Override Flag |
| Connected SCS |
| Emergency Device Flag |
| Emergency Device Override Flag |
| Permitted Service Capability Servers (SCS) |

TABLE 1-continued

| Field Name |
| --- |
| Permitted for LAP Modification |
| Permitted for Emergency Modification |
| Permitted for PDN Termination |

Low Access Priority is an existing field that was introduced by 3GPP Release 1, but currently the low access priority indicator is held only in the UE's USIM and the UE provides the indicator to the core network. It may also be held in the USS/UDR. It has been recognized herein that the Low Access Priority indicator may not be sufficient for characterizing M2M traffic. Devices may need to be characterized with more granularity. It is described herein that an additional field is used so that devices can be grouped into varying levels of priority. For example, this value can be within a range from 1-255, although embodiments are not so limited. By way of further example, higher numerical values may mean lesser priority, and the network may detach devices starting from the highest numerical value. As an alternative to the 'Low Access Priority' Flag described above, in an example embodiment, the "Low Access Priority Value" flag can be assigned a priority value of '0' to indicate that an associated device is not a LAP device, and any non-zero value can indicate that an associated device is a LAP device. This value may be passed on to the serving nodes (e.g., MME, SGSN, SGW, PGW and GGSN) at attachment and may be included in charging records so that charging can be based on the device priority.

The Low Access Priority Override Flag may help in resolving conflicts, for example, that occur when the UE mentions a different reason for connectivity than what is available in the stored UE record at the core network. For example, if the UE indicates a normal connectivity while the information at HSS/UDR (subscribed or SCS provided) mentions that the UE needs to be considered as LAP. In an example embodiment, this flag can take 3 values, although embodiments are not so limited:

1—UE Request is Preferred
2—Information in NW is Preferred
3—LAP Preferred

By way of example, if the flag value is 1, then the UE provided LAP indication may be considered. If the value is 2, for example, then the information that is stored in the network (either subscribed or SCS provided) value is considered. By way of further example, if the value is 3, then the connection is considered as LAP when either the network stored value or the UE provided value indicate LAP. Table 2 below lists example final decisions under different combinations in accordance with an example embodiment. It will be understood that the final decisions can vary as desired.

TABLE 2

| Override Flag Value | UE Indication | Value at the HSS/UDR | Result |
| --- | --- | --- | --- |
| 1 | ✓ LAP | ✓ LAP | ✓ LAP |
| 1 | ✓ LAP | x Not LAP | ✓ LAP |
| 1 | x Not LAP | ✓ LAP | x Not LAP |
| 1 | x Not LAP | x Not LAP | x Not LAP |
| 2 | ✓ LAP | ✓ LAP | ✓ LAP |
| 2 | ✓ LAP | x Not LAP | x Not LAP |
| 2 | x Not LAP | ✓ LAP | ✓ LAP |
| 2 | x Not LAP | x Not LAP | x Not LAP |
| 3 | ✓ LAP | ✓ LAP | ✓ LAP |

TABLE 2-continued

| Override Flag Value | UE Indication | Value at the HSS/UDR | Result |
|---|---|---|---|
| 3 | ✓ LAP | x Not LAP | ✓ LAP |
| 3 | x Not LAP | ✓ LAP | ✓ LAP |
| 3 | x Not LAP | x Not LAP | x Not LAP |

The Connected SCS value may refer to the SCS to which the UE is currently connected. This value may be filled by the core network or written by the SCS over the Mh interface. The Emergency Device Flag may indicate that the communications performed by the device needs to be considered as emergency type. If this flag is set, for example, it may need to be included in the charging records. The Emergency Device Override Flag may be similar to the LAP override flag described above. In an example embodiment, the emergency device override flag indicates if the UE provided indication should be considered or the value provisioned in the network should be considered. The Permitted Service Capability Servers (SCS) may be a grouped field that lists each SCS that can communicate with the UE/M2M device. It is possible for the device to be exclusively associated to only one SCS. The Permitted for LAP Modification field may specify if the SCS is allowed to modify the LAP information of the device that is maintained in the HLR/HSS/UDR. If an UE is allowed to communicate with multiple SCSs, for example, then only one SCS may be given the permission for LAP modification in accordance with an example embodiment. In an alternative embodiment, instead of one SCS, multiple SCS can be allowed to change LAP information, but, for example, the network may select the best value. For example, if SCS1 provides an example priority value of 5, SCS2 provides an example priority value of 3, and SCS3 provides an example priority value of 8, the network may choose the LAP value for the device as 3.

The Permitted for Emergency Modification field may specify if the SCS is allowed to modify the emergency information of a device. Similar to the field described above, one SCS can be given the permission to modify the 'emergency flag of an UE in accordance with one embodiment. Alternatively, in another embodiment, multiple SCSs can be permitted to change the emergency flag of an UE and the network can consider the device to be of emergency type if the device connects to a APN on which the SCS that set the 'emergency flag' resides. the Permitted for PDN Termination field may indicate if the SCS is allowed to terminate the PDN connection of an UE. The SCS may be restricted to terminate the PDN connection to the APN(s) on which the SCS resides.

The core network may need to maintain information related to the SCSs that have a business relation with the operator to perform mutual congestion control. The following fields in Table 3 are described above and presented by way of example and without limitation. The fields in Table 3 may be added into the subscription information that is maintained for each SCS in the core network.

TABLE 3

| Field Name |
|---|
| SCS Subscription ID |
| SCS FQDN |
| List of APNs |
| Congestion Coordination Flag |

TABLE 3-continued

| Field Name |
|---|
| CN Auto Overload Control |
| Attached Devices Threshold |

The SCS Subscription ID may be used to uniquely identify the SCS. The SCS FQDN field provides the FQDN of the SCS. This can be used by the CN to resolve the IP address of the SCS. A DNS Server IP may be provided for each SCS or a common DNS server may be used by the CN. Instead static IP may be used. In accordance with an example embodiment, if the CN needs to perform any policy control towards the SCS, such as controlling the data rate towards the SCS or constraining a device to allow access only to a single SCS for example, then the CN may require the IP address of the SCS. The List of APNs field may list the APNs via which the UEs can access the SCS. The Congestion Coordination Flag field may indicate if the SCS is capable to perform congestion control coordination with core network. The CN Auto Overload Control field may indicate if the CN can start restricting devices that are associated with this SCS during periods of congestion. The Attached Devices Threshold may indicate the maximum number of devices that may attach to this SCS before the CN may start rejecting new attaches or allowing new attaches at the expense of detaching lower priority devices.

Figure 11A:
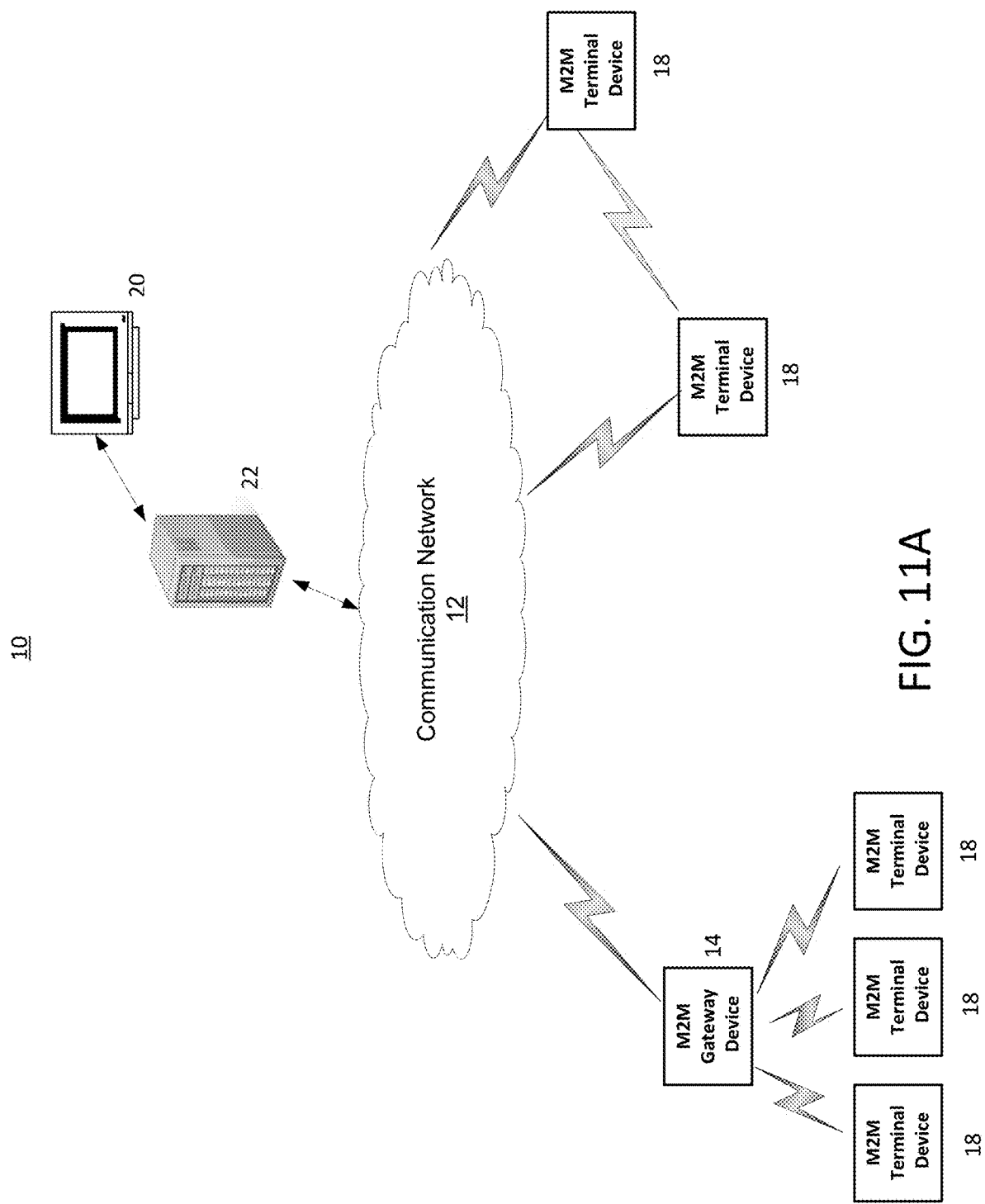
FIG. 11A is a system diagram of an example machine-to-machine (M2M) or Internet of Things (IoT) communication system in which one or more disclosed embodiments may be implemented.

FIG. 11A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the functions, devices, gateways, and/or servers illustrated in any of FIGS. 2-10 may comprise a node of a communication system such as the one illustrated in FIGS. 11A-D.

As shown in FIG. 11A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 11A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 11B:
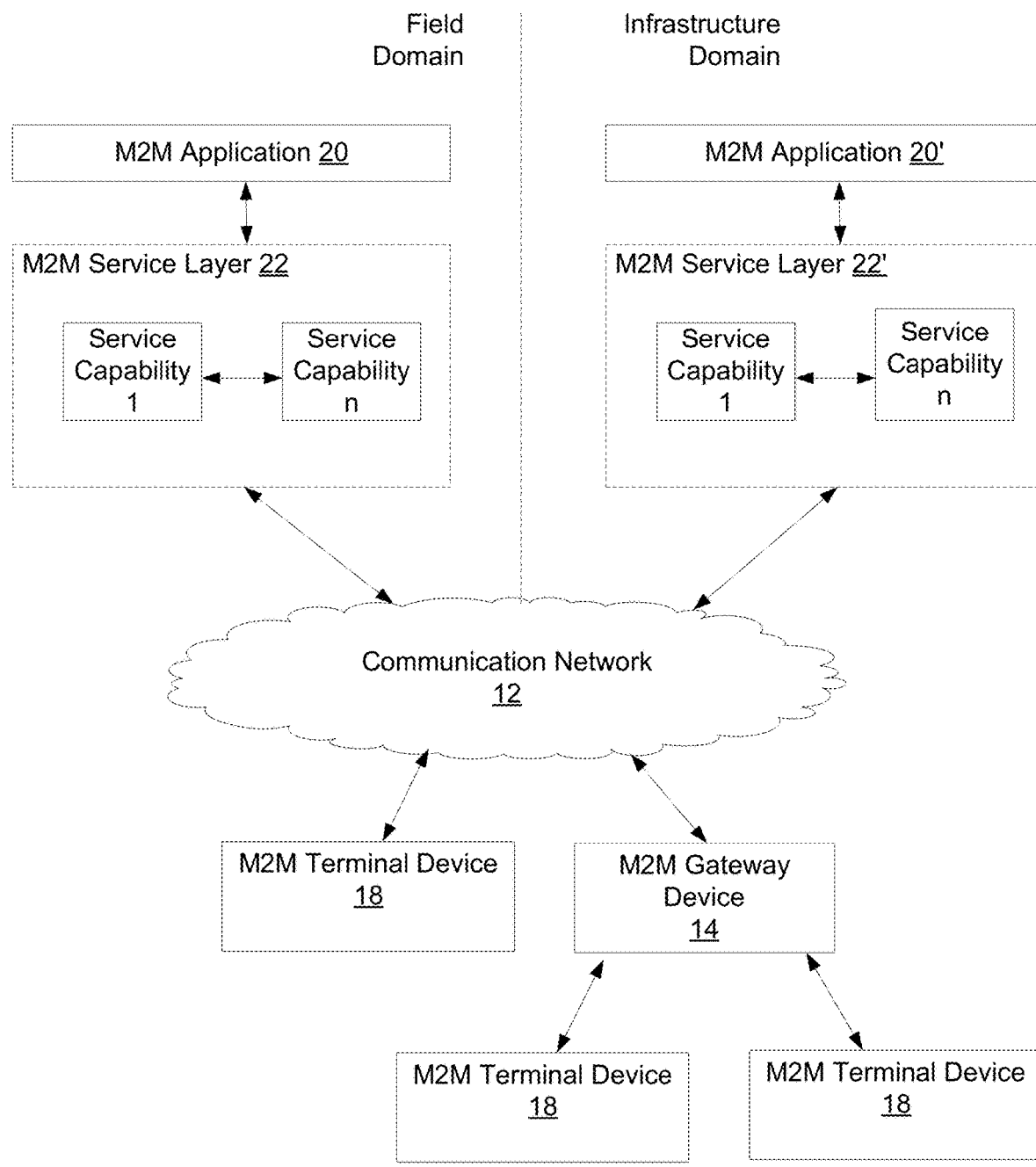
FIG. 11B is a system diagram of an example architecture that may be used within the M2M/IoT communication system illustrated in FIG. 11A.

Referring to FIG. 11B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 11B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 11A and 11B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof (e.g., the AF/SCS 104) may be implemented in the form of software running on a network node (e.g., server, computer, gateway, device, or the like) having the general architecture illustrated in FIG. 11C or 11D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 11C:
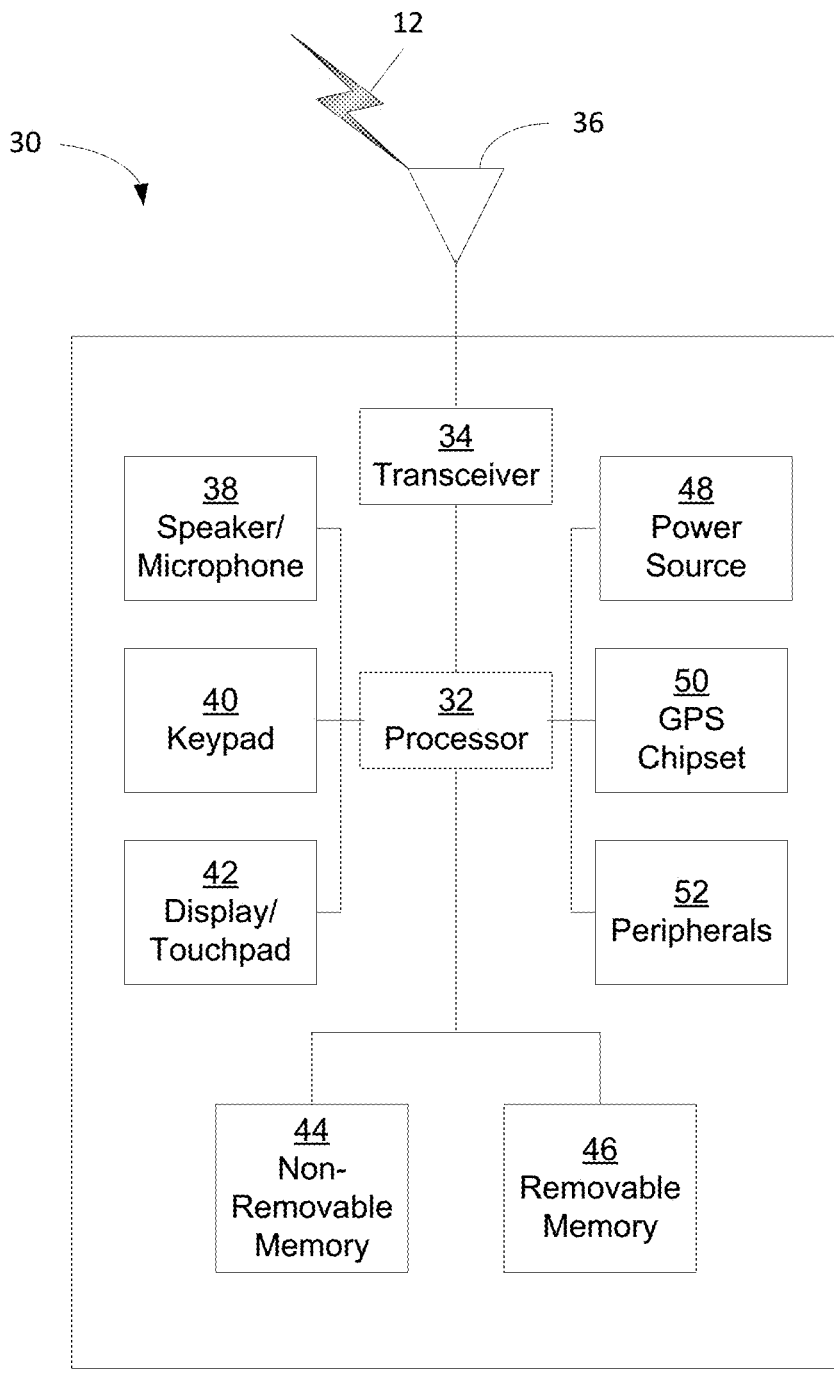
FIG. 11C is a system diagram of an example M2M/IoT terminal or gateway device that may be used within the communication system illustrated in FIG. 11A.

FIG. 11C is a block diagram of an example hardware/software architecture of a node of a network, such as one of the functions, devices, gateways, and/or servers illustrated in FIGS. 2-10 which may operate as an M2M server, gateway, device, or other node in an M2M network such as that illustrated in FIGS. 11A and 11B. As shown in FIG. 11C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the congestion management functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 11C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 11C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 2-10) and in the claims. While FIG. 11C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 11C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of the UE, and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 11D:
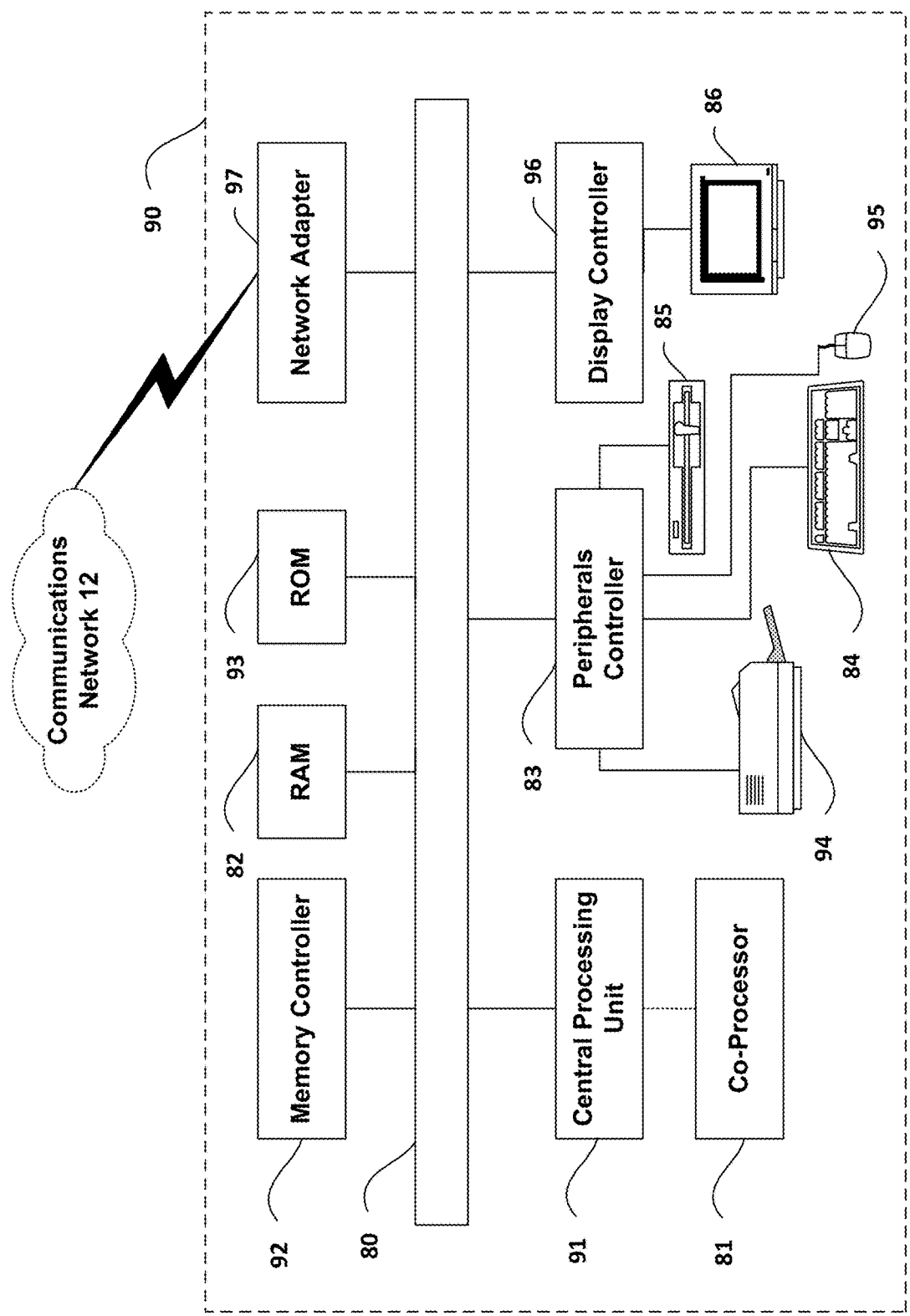
FIG. 11D is a block diagram of an example computing system in which aspects of the communication system of FIG. 11A may be embodied.

FIG. 11D is a block diagram of an exemplary computing system 90 which may also be used to implement one or more nodes of a network, such as the functions, devices, gateways, and/or servers illustrated in FIGS. 2-10, which may operates as an M2M server, gateway, device, or other node in an M2M network such as that illustrated in FIGS. 11A and 11B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 11A and FIG. 11B, to enable the computing system 90 to communicate with other nodes of the network. The communication circuitry, alone or in combination with the CPU 91, may be used to perform the transmitting and receiving steps described herein (e.g., in FIGS. 2-10) and in the claims.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to service level and core network technologies that may appear in the above description. Unless otherwise specified, the acronyms used herein refer to the corresponding term listed below.

3GPP 3rd Generation Partnership Project
ADC Application Detection and Control
AF Application Function
BSC Base Station Controller
CN Core Network
DDN Downlink Data Notification
EAB Extended Access Barring
EDGE Enhanced Data rates for GSM Evolution
EMM EPS Mobility Management
ESM EPS Session Management
E-UTRAN Evolved Universal Terrestrial Radio Access Network
eNB Evolved Node B
EPS Evolved Packet System
FE Front End
GBR Guaranteed Bit Rate
GERAN GSM EDGE Radio Access Network
GPRS General Packet Radio Service
GSM Global System for Mobile communications
GTP-C GTP Control
GTP-U GTP User
GTP GPRS Tunneling Protocol
HLR Home Location Register
HSS Home Subscriber Server
IE Information Element
IMS IP Multimedia Subsystem
LAP Low Access Priority
LTE Long Term Evolution
MBR Maximum Bit Rate
MME Mobility Management Entity
MNO Mobile Network Operator
MS Mobile Station
MTC Machine Type Communications
MTC-IWF Machine Type Communications-Inter-Working Function
OMA-DM Open Mobile Alliance-Device Management
OTA Over the Air
PCRF Policy and Charging Rules Function
PDN Packet Data Network
PGW PDN Gateway
PLMN Public Land Mobile Network
QoS Quality of Service RNC Radio Network Controller
RRC Radio Resource Control
SCS Services Capability Server
SDF Service Data Flow
SGSN Serving GPRS Support Node
S-GW Serving Gateway
SIM Subscriber Identity Module
SPR Subscription Profile Repository
TA Tracking Area
UDC User Data Convergence
UDR User Data Repository
UE User Equipment
UMTS Universal Mobile Telecommunications System
UTRAN Universal Terrestrial Radio Access Network This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method performed by an apparatus at a first core network node, the method comprising:
    transmitting, to a second core network node, a message to request a first congestion report for a geographic area;
    receiving, from the second core network node, the first congestion report comprising a congestion level and a list of entities that are impacted by a congestion in the geographic area; and
    sending, based the first congestion report and to an Application Function (AF)/Service Capability Server (SCS), a second congestion report comprising the congestion level and the list of entities, wherein the first core network node comprises an interworking function.

2. The method of claim 1, wherein the list of entities identifies one or more affected User Equipments.

3. The method of claim 1, wherein the second congestion report comprises an affected IP domain or Packet Data Network (PDN) or uplink data rate or downlink data rate or required percentage/volume of data rate reduction.

4. A method performed by an apparatus at a first core network node, the method comprising:
    receiving, from a second core network node, a message to request a first congestion report for a geographic area; and
    sending, to the second core network node, the first congestion report comprising a congestion level and a list of entities that are impacted by a congestion in the geographic area, wherein
    the second core network node transmits a second congestion report comprising the congestion level and the list of entities to an Application Function (AF)/Service Capability Server (SCS), based on the first congestion report, and
    the second core network node comprises an interworking function.

5. The method of claim 4, wherein the list of entities identifies one or more affected User Equipments.

6. A method performed by an Application Function (AF)/Service Capability Server (SCS), the method comprising:
    receiving, from a first core network node, a first congestion report comprising a congestion level and a list of entities that are impacted by a congestion in a geographic area,
        wherein a second congestion report is transmitted from a second core network node in response to a message from the first core network node to request the second congestion report for the geographic area; and
    mitigating, in response to the first congestion report, the congestion by one or more of reducing downlink traffic and modifying a session property,
        wherein the first core network node comprises an interworking function.

7. The method of claim 6, wherein mitigating the congestion comprises applying a downlink rate limit.

8. The method of claim 6, wherein mitigating the congestion comprises limiting a future downlink rate to a percentage of a current downlink rate.

9. The method of claim 6, wherein mitigating the congestion comprises applying a downlink packet drop rate.

10. The method of claim 6, wherein mitigating the congestion comprises sending an application layer message to command one or more UEs to take an action to reduce congestion.

11. The method of claim 6, wherein the first congestion report comprises an affected IP domain or Packet Data Network (PDN) or uplink data rate or downlink data rate or required percentage/volume of data rate reduction.

* * * * *